United States Patent [19]

Hata

[11] Patent Number: 5,231,441

[45] Date of Patent: Jul. 27, 1993

[54] FOCUSING DEVICE FOR DRIVING FOCUSING LENS GROUP ACCORDING TO A POSITION OF ZOOM LENS GROUP

[75] Inventor: Daisuke Hata, Funabashi, Japan

[73] Assignee: Ricoh Company, Ltd., Tokyo, Japan

[21] Appl. No.: 914,467

[22] Filed: Jul. 17, 1992

Related U.S. Application Data

[63] Continuation of Ser. No. 710,254, Jun. 4, 1991, Pat. No. 5,196,879, which is a continuation of Ser. No. 455,154, Dec. 22, 1989, abandoned.

[30] Foreign Application Priority Data

Dec. 23, 1988 [JP] Japan .................... 63-323468
Apr. 19, 1989 [JP] Japan .................... 1-97264
Nov. 18, 1989 [JP] Japan .................... 1-300044

[51] Int. Cl.$^5$ .............................................. G03B 3/10
[52] U.S. Cl. .................................. 354/400; 354/195.12
[58] Field of Search ............... 354/195.1, 195.12, 400, 354/402–409

[56] References Cited

U.S. PATENT DOCUMENTS

| | | | |
|---|---|---|---|
| 4,733,264 | 3/1988 | Hatase et al. | 354/408 X |
| 4,763,154 | 8/1988 | Iguchi et al. | 354/403 |
| 4,777,505 | 10/1988 | Hata et al. | 354/402 |
| 4,825,237 | 4/1989 | Hatase et al. | 354/195.12 X |
| 4,831,405 | 5/1989 | Hata et al. | 354/195.1 X |
| 4,899,190 | 2/1990 | Hata | 354/400 |

*Primary Examiner*—Michael L. Gellner
*Assistant Examiner*—J. K. Han
*Attorney, Agent, or Firm*—Oblon, Spivak, McClelland, Maier & Neustadt

[57] ABSTRACT

A lens controller comprises a focusing device for driving a focusing lens group; a zooming device for driving a zoom lens group; a focusing position detector for detecting the position of the focusing lens group on an optical axis; a zoom position detector for detecting the position of the zoom lens group on the optical axis corresponding to a focal distance thereof; a calculating device for respectively receiving outputs of the zoom and focusing position detectors and calculating a correction amount with respect to a shift in position of a formed image after the zoom lens group is driven by the zooming device; a control device for receiving the correction amount and controlling the operation of the focusing device such that the focusing lens group is moved to a focusing position with respect to the focal distance thereof; a device for judging whether or not the focusing lens group is located in inhibit regions on infinite and proximate sides respectively formed within a predetermined distance in a direction from an infinite position to a proximate position and in a direction from the proximate position to the infinite position; and a device for receiving an output of the judging device and inhibiting the focusing lens group from being moved in the directions toward the infinite and proximate positions when the focusing lens group is respectively located in the inhibit regions on the infinite and proximate sides.

2 Claims, 14 Drawing Sheets

| Fig. 6A | Fig. 6B | Fig. 6C |

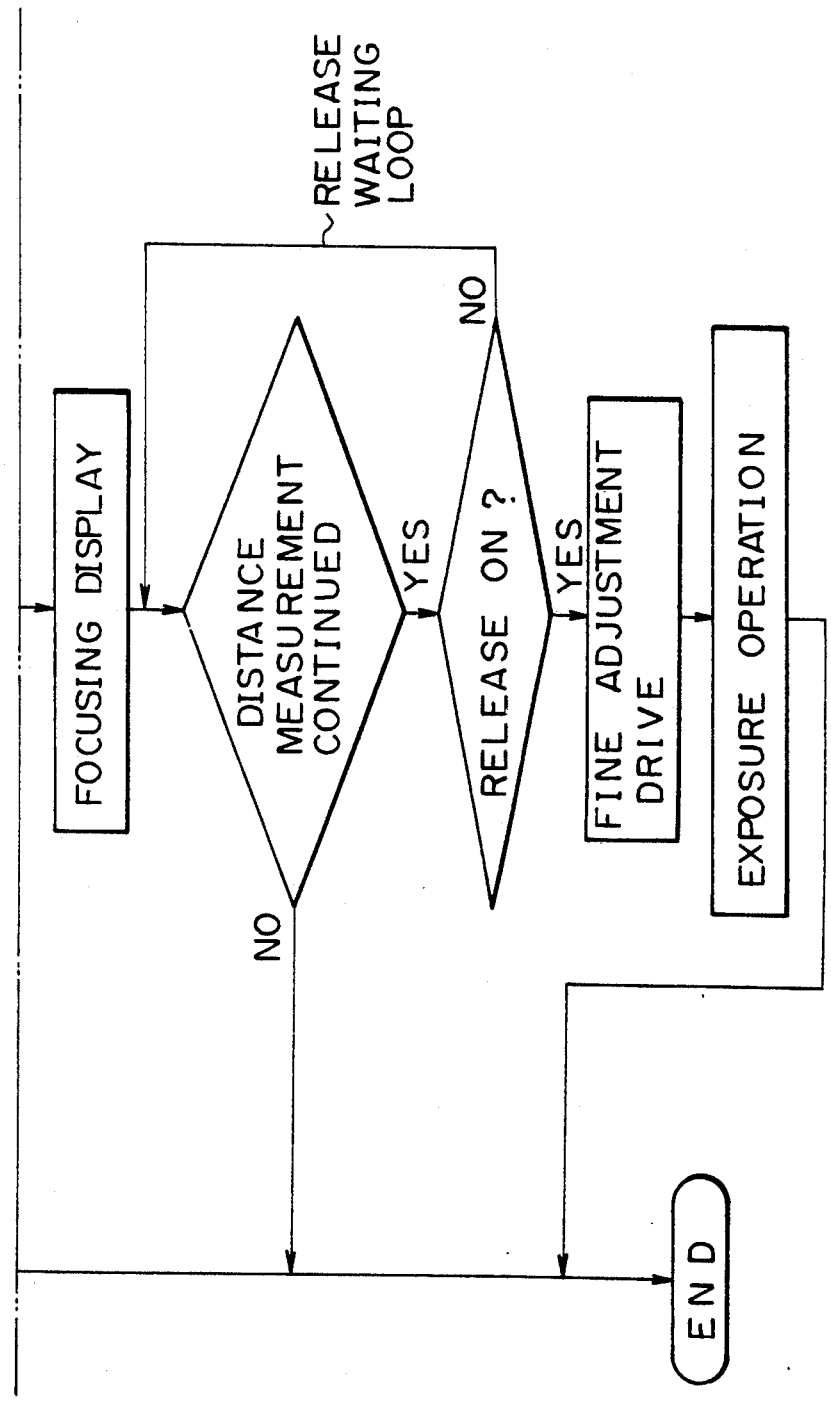

FOCUSING DEVICE FOR DRIVING FOCUSING LENS GROUP ACCORDING TO A POSITION OF ZOOM LENS GROUP

This is a continuation of application Ser. No. 07/710,254, filed Jun. 4, 1991 now U.S. Pat. No. 5,196,879, which is a continuation of Ser. No. 07/455,154, filed Dec. 12, 1989, now abandoned.

BACKGROUND OF THE INVENTION

1. Field of the Invention

The present invention relates to a lens controller. More particularly, the present invention relates to a lens controller for smoothly and accurately controlling the operation of a focusing lens group of a photographing optical system disposed on the same optical axis to a focusing position from a proximate position on this optical axis to an infinite position corresponding to the distance of a photographed object from a proximate distance to an infinite distance.

2. Description of the Related Art

With respect to a zoom lens, there is no shift in position of a formed image (a so-called focusing movement or shift) even when a zooming operation is performed. Accordingly, it is not necessary to adjust the focus every zooming operation so that the operability is improved. However, an open diaphragm F-number is in a dark state in comparison with a single focal point lens so that a skill is required to a certain extent with respect to the focusing adjustment or operation by a single-lens reflex type finder, for example.

Recently, the cameras have been automatically focused and the above problems have been solved so that the function of the zoom lens in itself can be fulfilled. Accordingly, an operator or user can pay attention to only the determination of a composition along the photographing intention, thereby greatly improving the operability.

In general, a focusing operation of a zoom lens is performed by moving a focusing lens group disposed in a portion of a zoom optical system. The zoom lens has the advantages that the moving amount of this focusing lens group is approximately the same with respect to the same distance of a photographed object in an entire zoom region (which is called "equal amount movement" in the following description). Accordingly, it is enough to attach a scale for the distance of the photographed object to a moving member (distance ring) of the focusing lens group, and attach an index to a fixed ring adjacent to this moving member. Therefore, it is not necessary to change the scale for the distance of the photographed object in response to the zooming operation.

However, in the zoom lenses in an inner focusing system and a rear focusing system, the lens construction is complicated when an optical design is performed under a condition in which the above-mentioned equal amount movement is realized. Further, the moving amount (drawing-out amount) of the focusing lens group on a wide angle side is excessively large. Such problems are different in extent from each other depending on the lens construction of the above-mentioned zoom optical systems. Further, by these problems, the outer diameter of a lens becomes large so that the lens and its body tube become heavy.

As mentioned above, a operability of the zoom lens is improved by the combination of the zoom lens and the automatically focusing function. However, the condition of the above equal amount movement with respect to the zoom lens must be satisfied. Therefore, it is still difficult to make the lens controller compact and reduce the cost thereof.

Therefore, the applicant of this application has proposed a varifocal lens controller for solving the above-mentioned problems as an invention (which is called the invention of the prior application in the following description) in Japanese Patent Application No. 62-013345 (see Japanese Patent Application Laying Open (KOKAI) No. 63-182620).

Namely, the above invention of the prior application relates to a lens controller for controlling the operation of a varifocal lens. In this invention, a zoom optical system is composed of a zoom lens group and a focusing lens group disposed on the same optical axis. The focusing lens group is set in a focusing position from a proximate position to an infinite position on the optical axis corresponding to the distance of a photographed object from a proximate distance to an infinite distance. Thereafter, the controller controls the operation of the varifocal lens causing a shift in position of a formed image with respect to the same photographed object by changing the zoom lens group a focal distance of the entire zoom optical system from an arbitrary first focal distance to a second focal distance between a shortest focal distance and a longest focal distance.

This lens controller comprises focal distance detecting means for detecting the above focal distance of the entire lens system; focusing lens group position detecting means for detecting the position of the above focusing lens group on the above optical axis; and maximum drawing-out amount calculating means for receiving an output of the above focal distance detecting means and calculating a drawing-out amount of the above focusing lens group from the above infinite position to the above proximate position with respect to the above focal distance. The lens controller further comprises proportional constant calculating means for respectively receiving outputs of the maximum drawing-out amount calculating means and the above focusing lens group position detecting means and calculating a ratio of these outputs. The lens controller further comprises focusing correction calculating means for respective outputs of the proportional constant calculating means, the above maximum drawing-out amount calculating means and the above focusing lens group position detecting means and calculating, as a correction value, a shift amount of the position of the formed image from the above focusing position caused by the change in focal distance of the entire lens system. The lens controller further comprises focusing drive means for driving the above focusing lens group; and moving amount monitoring means for generating a signal corresponding to the moving amount of the above focusing lens group. The lens controller further comprises focusing control means for respectively receiving outputs of this moving amount monitoring means and the above focusing correction calculating means and controlling the above focusing lens group to move to the above focusing position. The lens controller further comprises zoom drive means for driving the above zoom lens group; and zoom control means for receiving a start signal from start means separately disposed and controlling the operation of the above zoom drive means. The lens controller is constructed to automatically correct the shift in position of the formed image caused by the change in focal distance of the above entire zoom optical system.

In the automatically focusing camera, to obtain information of the photographing distance, the position (the drawing-out amount) of the focusing lens after the focusing operation is detected and the information of the photographing distance is calculated on the basis of the detected position information.

The applicant of this application has proposed an invention with respect to a display of the photographing distance in Japanese Patent Application Laying Open (KOKAI) No. 63-291018, for example, and an invention with respect to a shift correction in Japanese Patent Application Laying Open (KOKAI) No. 63-182620, for example.

In accordance with the structure of the above invention in Japanese Patent Application Laying Open (KOKAI) No. 63-182620, the lens optical system has a very simple construction and is compact, light and cheaply manufactured. Further, the entire lens controller is similarly compact, light and cheaply manufactured. Further, in this lens controller, even when the zoom lens group is moved from an arbitrary first focal distance to a second focal distance to change the focal distance of the entire lens system, the shift in position of a formed image peculiar to a varifocal lens can be instantly corrected and a focusing state can be held. Accordingly, a lens similar to the zoom lens can be substantially obtained in use.

However, in a certain case, the above varifocal lens is constructed such that the focusing position in the infinite position (∞ position) is not changed and the focusing position in the proximate position is changed to move away from the infinite position with respect to the change in focal distance of the entire lens system from the above shortest focal distance to the longest focal distance. For example, when the operation of the focusing lens group is controlled while the zooming operation of the zoom lens group is performed from the long focal point side to the short focal point side, conversely, from the short focal point side to the long focal point side, it is proved that this focusing lens group hits against a positioning member such as a stopper, etc. in the infinite and proximate positions and thereby cannot be moved so that the controller is disabled and an excessive load is applied to a drive motor.

Further, similar to the above case, there is a problem about the hit against the positioning member even when the photographing lens is constructed by a zoom lens instead of the varifocal lens, and even when the focusing lens group is driven to perform the focusing adjustment without changing the focal distance.

Further, when the focusing lens group is driven on the basis of information about the measured distance from a distance measuring means, the focusing lens group is not driven or stopped with only one point as a target, but a predetermined width (generally, the width in a very small range approximately corresponding to the depth of the photographed object) is set. When the focusing lens group is driven within this width (focusing width), the lens group is set to be operated in a focusing state. This construction is provided to prevent mechanical errors, the hunting of the control system, etc. Accordingly, there is a problem about the reduction of the accuracy in information of the photographing distance provided from the position information of the focusing lens group.

When the zoom lens, etc. are used, the above focusing width is wider in a wide position than in a telescopic position and the accuracy in information of the above photographing distance is further reduced even when the F number is same.

Further, similar problems are caused even when the varifocal lens is used.

SUMMARY OF THE INVENTION

It is therefore a first object of the present invention to provide a lens controller which is cheaply manufactured and has a simple construction and prevents in advance the generation of an excessive load of a focusing drive means in the infinite and proximate positions tending to be caused when the focusing lens group is driven to perform the focusing adjustment, etc., and prevents the drive means from being disabled in drive control, thereby performing the zoom drive operation reliably and rapidly.

A second object of the present invention is to provide a lens controller which is cheaply manufactured and has a simple construction and can calculate the photographing distance with a high accuracy without narrowing a focusing range and can particularly perform a focusing correction with a high accuracy in a varifocal lens.

The above first object of the present invention can be achieve by a lens controller comprising focusing drive means for driving a focusing lens group; zoom drive means for driving a zoom lens group; focusing lens group position detecting means for detecting the position of the focusing lens group on an optical axis; zoom lens group position detecting means for detecting the position of the zoom lens group on the optical axis corresponding to a focal distance thereof; focusing correction calculating means for respectively receiving outputs of the zoom lens group position detecting means and the focusing lens group position detecting means and calculating a correction amount with respect to a shift in position of a formed image after the zoom lens group is driven by the zoom drive means; focusing correction control means for receiving the correction amount and controlling the operation of the focusing drive means such that the focusing lens group is moved to a focusing position with respect to the focal distance thereof; lens position judging means for judging whether or not the focusing lens group is located in an inhibit region on an infinite side formed within a predetermined distance in a direction from an infinite position to a proximate position and in an inhibit region on the proximate side formed within a predetermined distance in a direction from the proximate position to the infinite position; and focusing drive inhibiting means for receiving an output of the lens position judging means and inhibiting the focusing lens group from being moved in the directions toward the infinite and proximate positions when the focusing lens group is respectively located in the inhibit regions on the infinite and proximate sides.

The present invention also resides in a lens controller comprising focusing drive means for driving a focusing lens group; zoom drive means for driving a zoom lens group; focusing lens group position detecting means for detecting the position of the focusing lens group on an optical axis; zoom lens group position detecting means for detecting the position of the zoom lens group on the optical axis corresponding to a focal distance thereof; photographing distance detecting means for judging the photographing distance until a photographed object and outputting measured distance data corresponding to the photographing distance; focusing correction calculating means for respectively receiving outputs of the zoom lens group position detecting means and the focusing lens group position detecting means and the measured distance data and calculating a drive amount of the focusing lens group until a focusing position, the focusing correction calculating means outputting a limiting drive amount set in advance instead of the drive amount when the drive amount is larger than the limiting drive amount; focusing correction control means for receiving the drive amount or limiting drive amount and controlling the operation of the focusing drive means such that the focusing lens group is moved to the focusing position with respect to a focal distance thereof; and focusing drive inhibiting means for inhibiting the focusing lens group from being moved in directions towards infinite and proximate positions when the focusing lens group is respectively located in the infinite and proximate positions.

The above second object of the present invention can be achieved by a lens controller for controlling the operation of a focusing lens group in a photographing optical system disposed on the same optical axis such that the focusing lens group is moved to a focusing position on the optical axis from a proximate position to an infinite position, the controller comprising drawing-out amount detecting means for detecting a drawing-out amount drawn out of the focusing lens group by the movement thereof; preset drawing-out amount calculating means receiving a light from a photographed object through the photographing optical system and calculating a preset drawing-out amount until the focusing position of the focusing lens group; focusing drive means for receiving an output from the preset drawing-out amount calculating means and driving the focusing lens group; focusing state judging means for judging that the focusing lens group is in a focusing state when the focusing lens group is located within a small focusing range; and photographing distance calculating means for calculating a photographing distance from both outputs of the drawing-out amount detecting means and the preset drawing-out amount calculating means when the focusing lens group is in the focusing state.

The present invention also resides in a lens controller comprising drawing-out amount detecting means for detecting a drawing-out amount drawn out of a focusing lens group by a movement thereof; preset drawing-out amount calculating means receiving a light from a photographed object through a photographing optical system and calculating a preset drawing-out amount until a focusing position of the focusing lens group; focusing drive means for receiving an output from the preset drawing-out amount calculating means and driving the focusing lens group; focusing state judging means for fudging that the focusing lens group is in a focusing state when the focusing lens group is located within a small focusing range; and correction fine adjustment calculating means for calculating a preset correction amount with respect to a shift in position of a formed image and a fine adjustment amount for performing a fine adjustment from both outputs of the drawing-out amount detecting means and the preset drawing-out amount calculating means when the focusing lens group is in the focusing state.

In the lens controller of the present invention constructed as above, the inhibit regions are disposed on the infinite and proximate sides. When the focusing lens group is located in the respective inhibit regions, the focusing drive inhibiting means inhibits the focusing lens group from being moved in the directions toward the infinite and proximate positions. Accordingly, when a mechanical stopper is disposed in the infinite and proximate positions, it is possible to prevent the focusing lens group from hitting against this stopper. In other words, it is possible to avoid a useless operation so that the lenses can be driven rapidly and a drive force energy can be saved, thereby improving the operability.

Further, in the lens controller in accordance with the present invention, when the drive amount calculated by the focusing correction calculating means is larger than the limiting drive amount, the focusing correction calculating means outputs the limiting drive amount instead of the correction by the drive amount. Accordingly, no large error in operation is caused even when the output information of the zoom lens group position detecting means and/or the focusing lens group position detecting means is not correct. Further, when the focusing lens group is located in the inhibit region on the infinite or proximate side, the focusing correction control means inhibits the operation of the focusing drive means.

Further, in the lens controller in accordance with the present invention, even when the focusing position is provided in a range of a certain width, the photographing distance calculating means calculates the error amount of both outputs of the drawing-out amount detecting means and the preset drawing-out amount calculating means and calculates the photographing distance, thereby providing the photographing distance information with a high accuracy.

Further, in the lens controller in accordance with the present invention, the correction fine adjustment calculating means calculates the fine adjustment amount corresponding to the above error amount in addition to the correction amount for correcting the shift in position of the formed image. Accordingly, the shift in position of the formed image can be corrected with a high accuracy.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a lens controller in the present invention will next be described in detail with reference to the accompanying drawings.

Figure 1A:
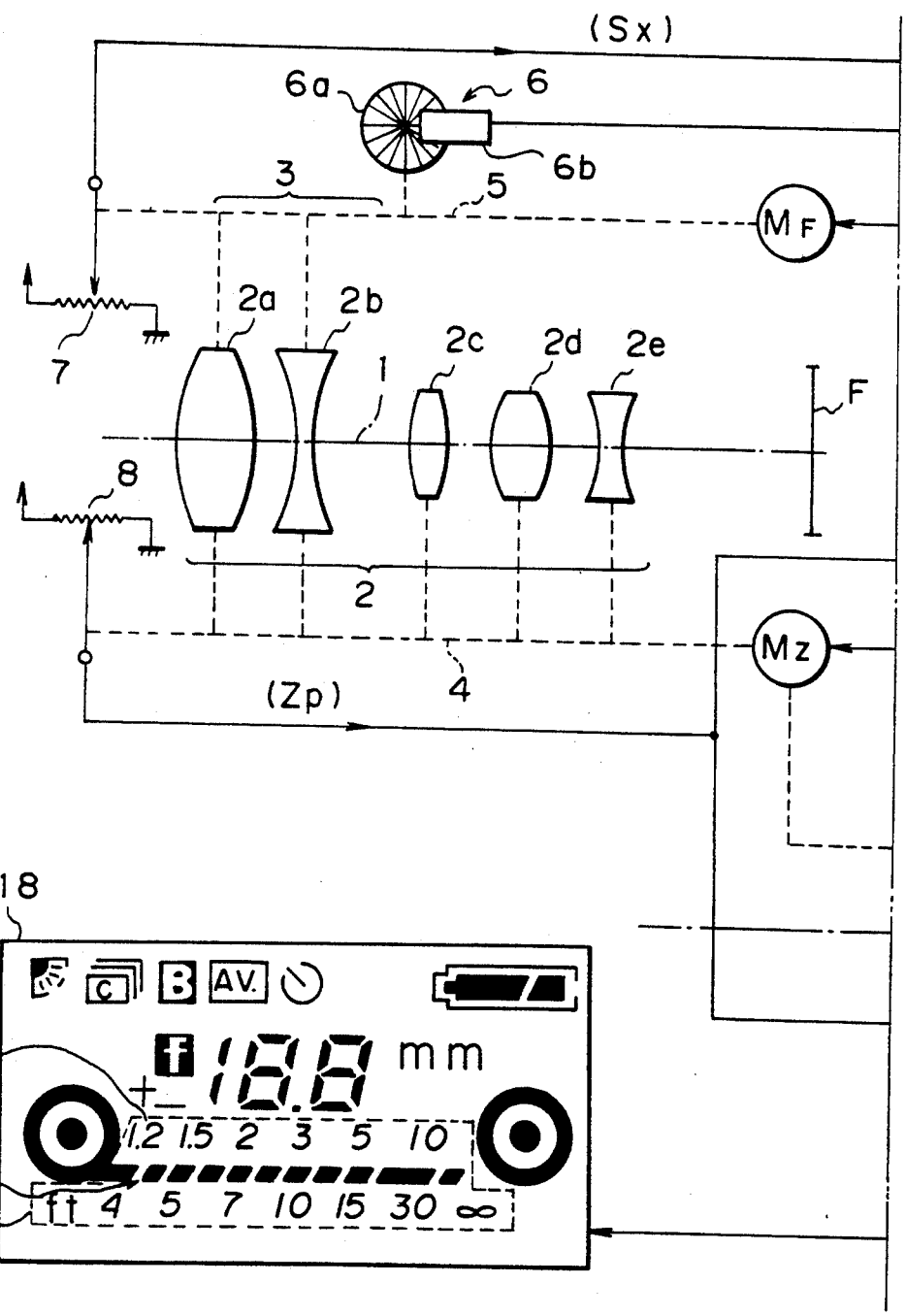
FIG. 1 is a block diagram showing the entire construction of a lens controller in accordance with a first embodiment of the present invention.
Figure 1B:
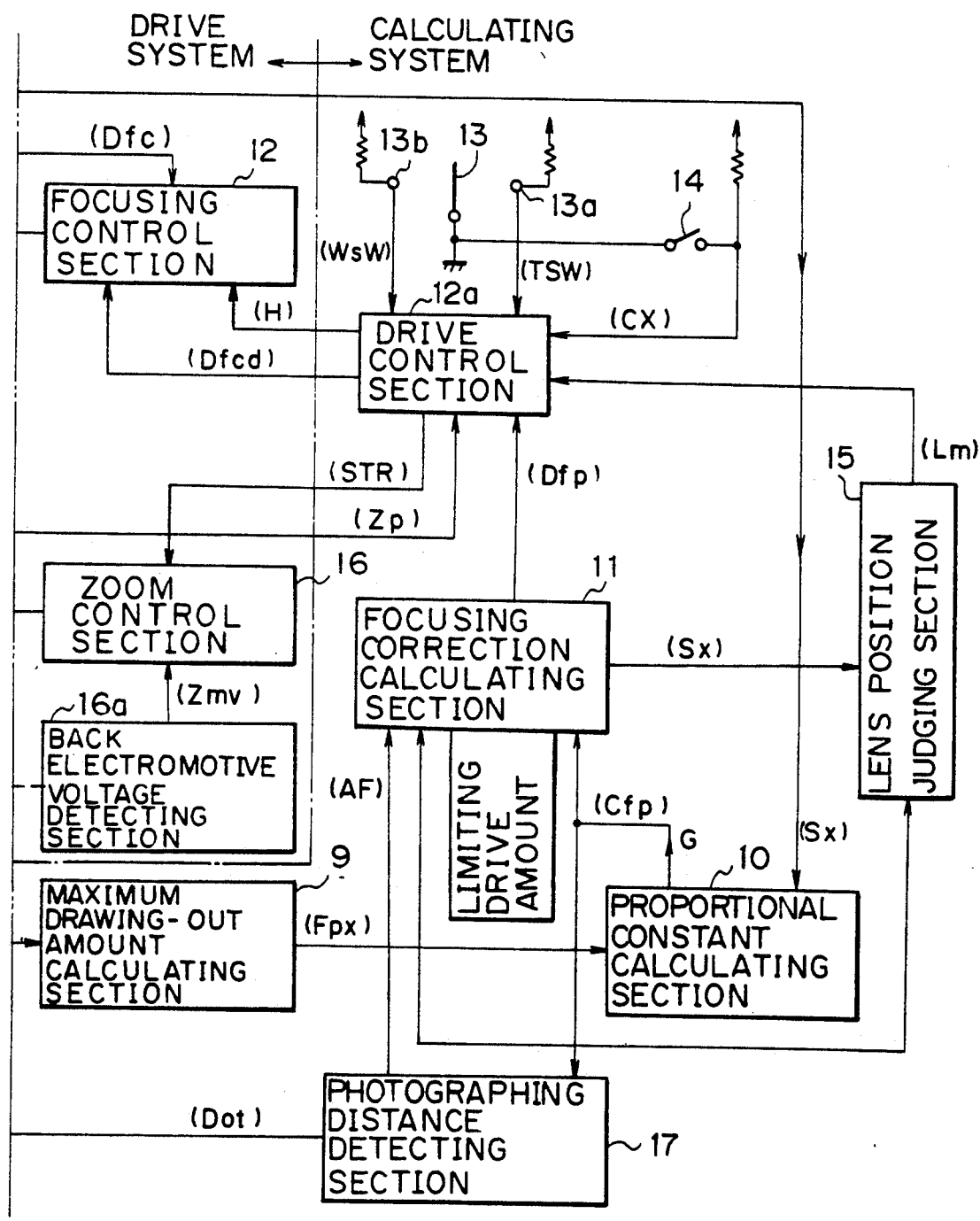

FIG. 1 is a block diagram showing the entire construction of a lens controller in a first embodiment of the present invention.

In FIG. 1, reference numeral 1 designates an optical axis of a zoom optical system. A zoom lens group 2 as a varifocal lens is disposed on the optical axis 1 so as to move therealong and constructs the zoom optical system. Reference numerals 2a, 2b, 2c, 2d and 2e respectively designate first, second, third, fourth and fifth lens groups which are respectively constructed by a single lens or a plurality of lenses. The zoom lens group 2 includes the first and second lens groups 2a, 2b and is also constructed by the third to fifth lens groups 2c to 2e. The focusing lens group 3 is constructed by the first lens group 2a and the second lens group 2b. Reference numeral F designates a film face.

A zoom drive section 4 is composed of a zooming motor Mz and an unillustrated mechanical section. The zooming motor Mz is disposed as a zoom drive means for driving the zoom lens group 2 to set a focal distance of the above entire lens system to an arbitrary focal distance from the focal distance on a telescopic side as a longest focal distance to the focal distance on a wide angle side as a shortest focal distance. The focal distance on the telescopic side is simply called "tele-side" in the following description and the focal distance on the wide angle side is simply called "wide side" in the following description. A focusing drive section 5 is composed of a focusing motor $M_F$ and an unillustrated mechanical section. The focusing motor $M_F$ is disposed as a focusing drive means for driving and moving the first and second lens groups 2a and 2b to a focusing position from an infinite position ($\infty$ position) on the optical axis 1 to a proximate position corresponding to the distance of a photographed object from an infinite distance to a proximate distance. Namely, this focusing drive means moves the first and second lens groups 2a and 2b in the direction of the optical axis in a state in which the distance therebetween is constantly held.

A focusing counter 6 and a focusing lens group position detector 7 are operated by the focusing drive section 5 together with the focusing lens group 3, i.e., the first and second lens groups 2a and 2b. The focusing lens group position detector 7 functions as a means for detecting the position of the focusing lens group (which is simply called FPM in the following description). The focusing counter 6 generates a pulse proportional to the number of rotations of a slit disc 6a by the rotation thereof from a photo-interrupter 6b and detects a moving amount of the focusing lens group 3 on the optical axis 1. The FPM 7 outputs a voltage proportional to the position of the focusing lens group 3 on the optical axis as focusing position information Sx. A zoom lens group position detector 8 functions as a means for detecting the position of the zoom lens group (which is simply called ZPM in the following description). The ZPM 8 is operated by the zooming drive section 4 together with the zoom lens group 2 and outputs a voltage proportional to the focal distance of the above entire lens system as focal distance information Zp.

A maximum drawing-out amount calculating section 9 receives the above focal distance information Zp and performs an A/S conversion thereof and calculates a moving amount (i.e., a drawing-out amount) Fpx of the focal distance information from the infinite position to the proximate position with respect to this focal distance information Zp. A proportional constant calculating section 10 receives the output Fpx of this maximum drawing-out amount calculating section 9 and an output Sx as the focusing position information of the FPM 7 and performs an A/D conversion with respect to the output Sx. The proportional constant calculating section 10 then calculates a ratio with respect to these outputs and outputs a proportional constant Cfp.

A focusing correction calculating section 11 as a means for calculating a focusing correction receives the above three outputs Fpx, Cfp and Sx and calculates a correction amount (drive amount) Dfp for performing the focusing operation. The focusing correction calculating section 11 then compares this correction amount Dfp with a limiting drive amount Dmax set in advance. When Dfp≧Dmax, the focusing correction calculating section 11 outputs the Dmax.

A focusing control section 12 as a means for controlling the focusing correction receives an output Dfc of the focusing counter 6, an inhibit signal (H) and an output Dfcd corresponding to the correction amount Dfp of the above focusing correction calculating section 11. Then, the focusing control section 12 controls the operation of the focusing drive section 5.

A drive control section 12a as a means for inhibiting the focusing drive receives a limit signal (Lm) described later, a wide signal (WSW), a telescopic signal (TSW), a switching signal (CX) and the correction amount (Dfp). The drive control section 12a outputs the inhibit signal (H) by the driving direction thereof.

Start sections 13 and 14 are respectively constructed by an operating switch and a change-over switch composed of a pushbutton switch and operable from the exterior of the lens controller. Reference numerals 13a and 13b respectively designate a contact for increasing the magnification (which is simply called "up-contact" in the following description) and a contact for decreasing the magnification (which is simply called "down-contact" in the following description). The change-over switch 14 outputs the switching signal (CX) for commanding the focusing operation in a turning-off state shown in FIG. 1 and commanding the zooming operation in a turning-on state. When the change-over switch 14 commands the focusing operation and the operating switch 13 is located on the side of the up-contact 13a, the telescopic signal (TSW) outputted from the up-contact 13a shows the movement onto the proximate side. When the change-over switch 14 commands the focusing operation and the operating switch 13 is located on the side of the down-contact 13b, the wide signal (WSW) outputted from the down-contact 13b shows the movement onto the infinite side.

A lens position judging section 15 as a means for judging the lens position receives the above drawing-out amount (Fpx) and the above focusing position information (Sx). When the focusing lens group 3 is located in an inhibit region, the lens position judging section 15 outputs the limit signal (Lm).

A zoom control section 16 receives a start signal STR and a motor speed signal Zmv and controls the operation of the zoom drive section 4. When the zoom control section 16 drives the zooming motor Mz, a back electromotive voltage detecting section 16a detects a back electromotive voltage generated in the zooming motor Mz and outputs this voltage as the motor speed signal (Zmv).

A photographing distance detecting section 17 as a means for detecting the photographing distance measures the distance from the lens system to a photographed object and outputs measured distance data (AF) corresponding to the photographing distance. The photographing distance detecting section 17 then receives the proportional constant (Cfp) and outputs a display signal (Dot).

A display section 18 receives the above display signal (Dot). An index section 18a is composed of twelve display dots. Numerical sections 18b and 18c correspond to the display section 18 and are respectively constructed by units "meter" and "feet". The input and output relations of the respective sections are shown by only main signals.

Figure 2:
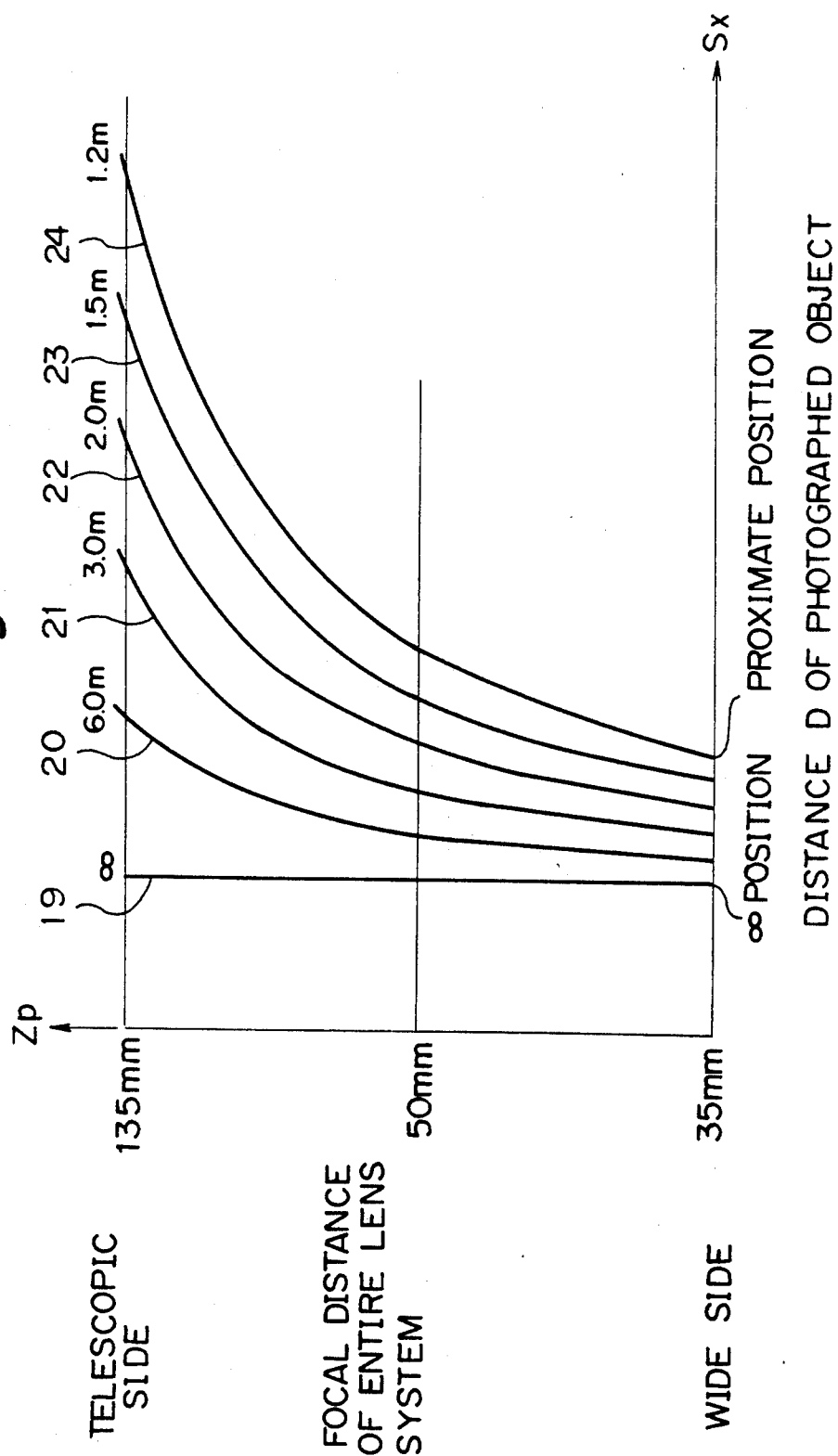
FIG. 2 is a graph showing operating characteristics of the lens controller shown in FIG. 1 and showing the relation between a focal distance f of an entire lens system to be set and a drawing-out amount Sx of a focusing lens group corresponding to a distance D of a photographed object with respect to every distance of each photographed object.

FIG. 2 is a graph showing operating characteristics of the varifocal lens shown in FIG. 1. FIG. 2 shows the focal distance f of the entire lens system to be set and the drawing-out amount (moving amount) corresponding to the distance D of the photographed object of the focusing lens group 3 (the first and second lens groups 2a and 2b) every typical distance D of each photographed object. In FIG. 2, the change in focal distance f of the entire lens system is shown on the axis of ordinate and the drawing-out amount of the focusing lens group 3 is shown on the axis of abscissa with the focusing position for the infinity as a reference. In this example, the telescopic position is shown by f=135 mm and the wide position is shown by f=35 mm.

In FIG. 2, reference numerals 19 to 24 designate focusing curves and show the change in drawing-out amount of the focusing lens group 3 from the infinite position to the focusing position with respect to the change in focal distance information Zp when the distance D of the photographed object on the left-hand side of a formula (1) described later is set to ∞, 6.0 m, 3.0 m, 2.0 m, 1.5 m and 1.2 m, respectively. Namely, when set constants $C_0$, $C_1$ and $C_2$ are respectively determined at a designing time, the distance D of the photographed object can be calculated by using the following calculating formula from the focal distance information Zp and the focusing position information Sx.

$$D = (C_0 Z_p + C_1) S_x + C_2 \quad (1)$$

Accordingly, the focusing curve 24 shown in FIG. 2 is a focusing curve in proximity having a maximum drawing-out amount and this focusing curve in proximity is therefore set to Fpx particularly.

Figure 3:
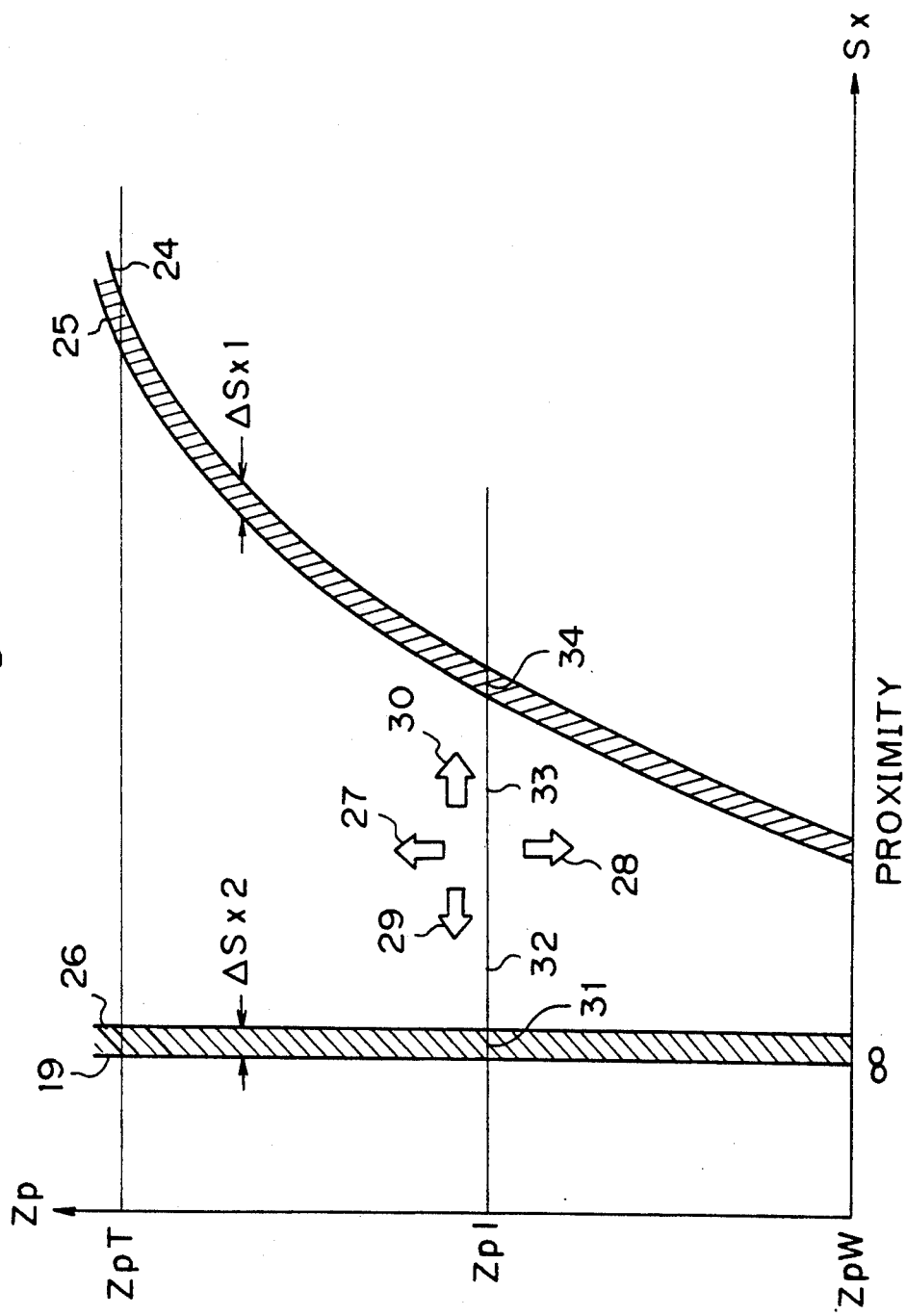
FIG. 3 is a graph for explaining the operation of the lens controller in the first embodiment and omitting a portion of the graph of FIG. 2.

FIG. 3 is a characteristic graph for explaining the operation of the lens controller in this embodiment and omitting a portion of the curves in FIG. 2.

In FIG. 3, reference numerals ZpT and ZpW are values of the focal distance information Zp when the zoom lens group 2 is located on the telescopic side and the wide side, respectively. Reference numeral Zp1 is a value of the Zp when the zoom lens group 2 is located in an arbitrary position between the telescopic side and the wide side. Reference numerals 25 and 26 respectively designate limiting curves for showing the vicinity of the focusing curves 24 and 19 by enlarging them. Reference numeral ΔSx1 designates a limiting band on the proximate side as an inhibit region on the proximate side formed between the above focusing curve 24 and the above limiting curve 25 located in a position moved by a small distance on the infinite side in the direction of the Sx from the focusing curve 24. Reference numeral ΔSx2 designates a limiting band on the infinite side as an inhibit region on the infinite side formed between the focusing curve 19 and the above limiting curve 26 located in a position moved by a small distance on the proximate side in the direction of the Sx from the focusing curve 19.

Reference numerals 27 to 30 designate arrows showing the moving direction of the lens group. The arrows 27 and 28 respectively show the movement in the directions for increasing and decreasing the magnification of the zoom lens group 2. The arrows 29 and 30 respectively show the movement in the infinite and proximate directions of the focusing lens group 2. Reference numerals 31 to 34 designate points showing the lens position on Zp=Zp1. The point 31 is located within the limiting band ΔSx2. The point 34 is located within the limiting band ΔSx1. The points 32 and 33 are located in a safe region except for the above limiting bands ΔSx1 and ΔSx2. The limiting bands ΔSx1 and ΔSx2 have a small distance set such that no defocus is provided.

Figure 4A:
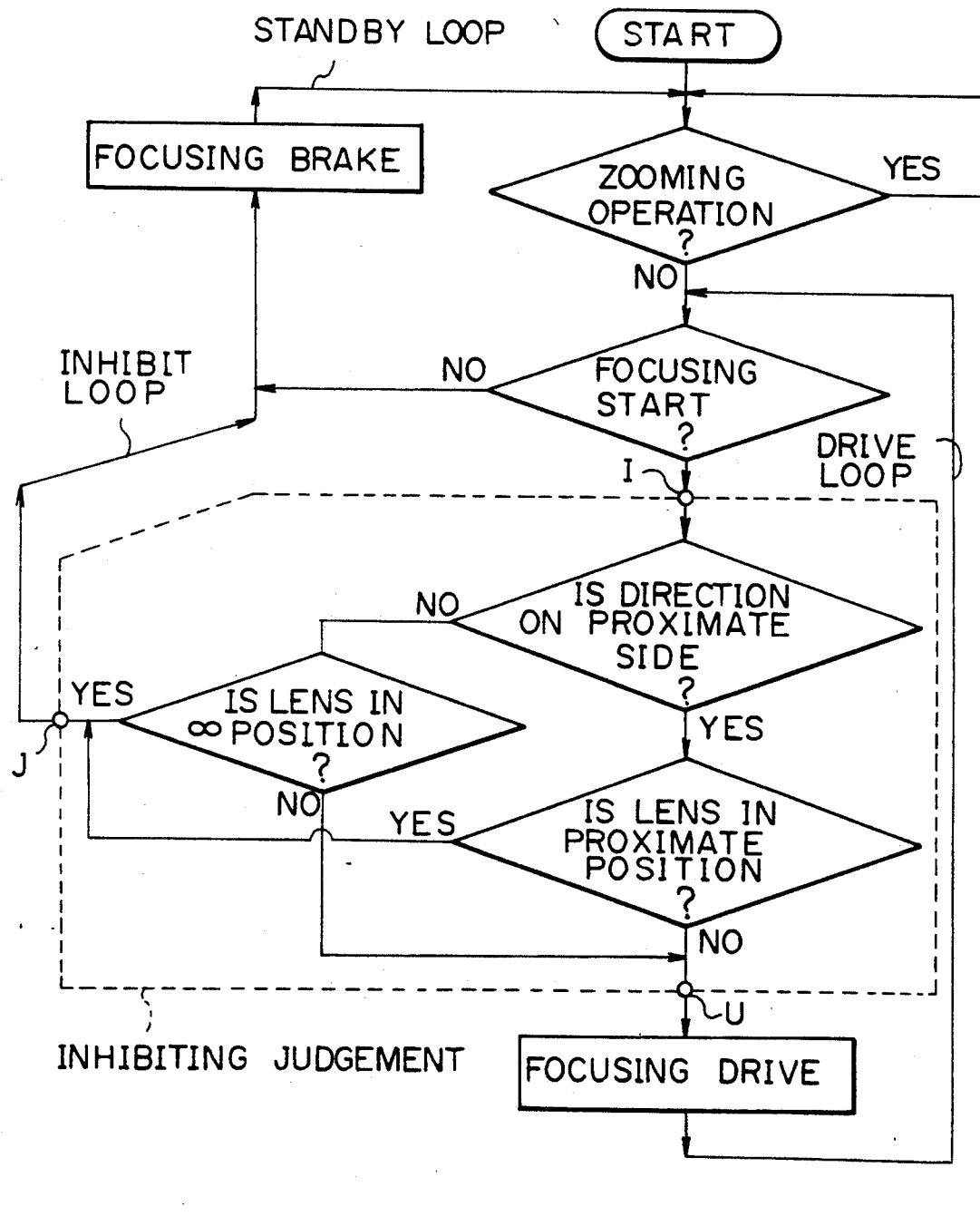
FIGS. 4 and 5 are flow charts showing an operational sequence of the lens controller in the first embodiment of FIG. 1 and respectively show a flow chart of focusing and zooming operations and a flow chart of an automatic focusing operation.
Figure 4B:
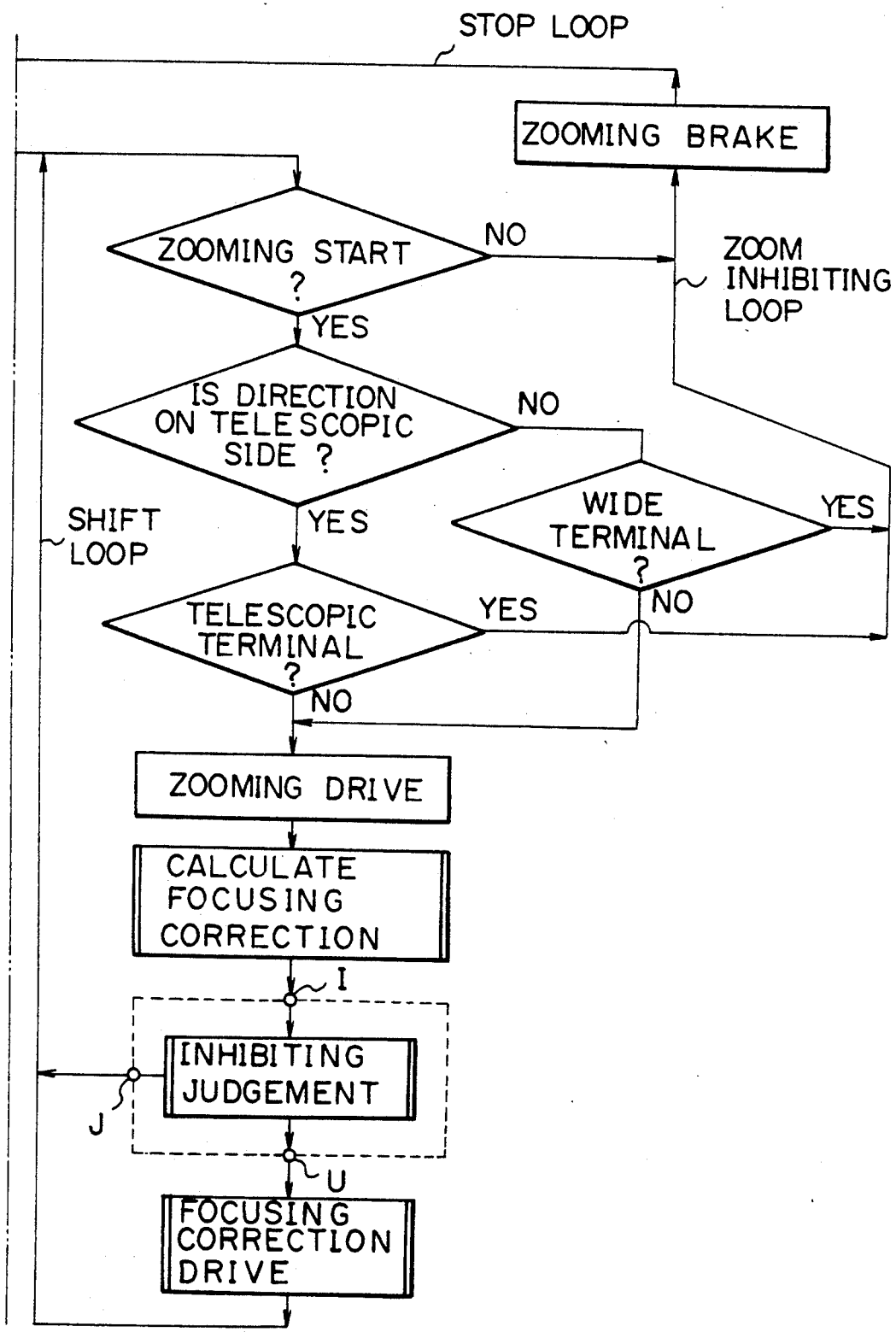
Figure 5:
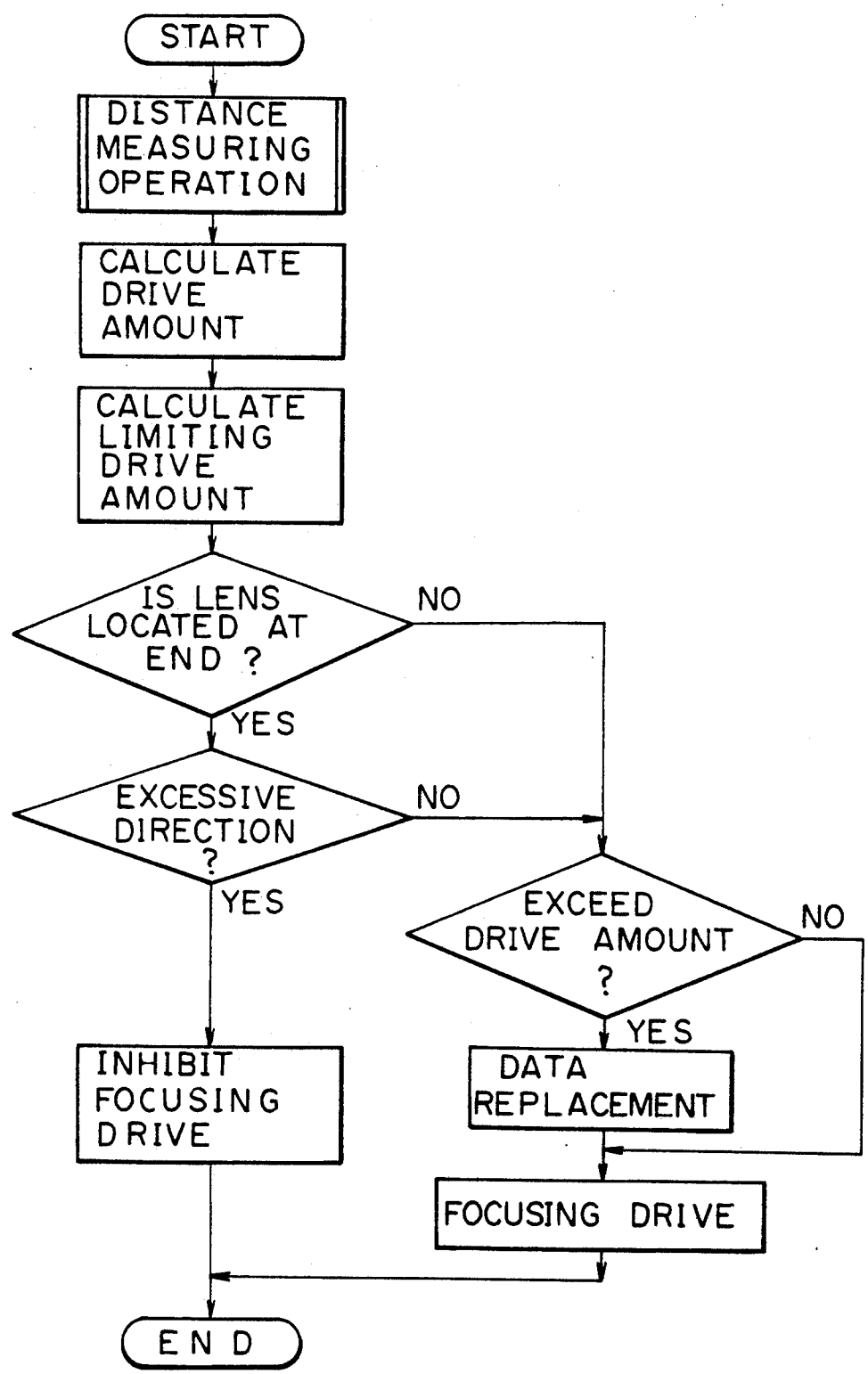

FIGS. 4 and 5 are flow charts showing an operating sequence of the lens controller in the embodiment shown in FIG. 1.

In FIG. 4, an internal portion surrounded by a dotted line shows the same operation. Reference numerals I, U and J respectively designate an input terminal, an output terminal and a jump output terminal of a program.

The operation of the lens controller having the above-mentioned construction in this embodiment will next be described along the flow chart.

The zooming and focusing operations will be first described with reference to FIG. 4. It is assumed that the change-over switch 14 in FIG. 1 is turned off (in an open state) and the operating switch 13 is in a neutral position. The flow chart of FIG. 4 is started from a step "START". In a first conditional step "zooming operation?", the drive control section 12a checks the switching signal (CX) from the change-over switch 14. In the present case, since the change-over switch 14 is turned off, the drive control section 12a judges that it is the focusing operation. Therefore, the judging result in this step is NO. In the next conditional step "focusing start?", the drive control section 12a checks the telescopic signal (TSW) and the wide signal (WSW). In the present case, the operating switch 13 is in the neutral position and therefore no signal is outputted therefrom so that the judging result in this step is NO. In the next conditional step "focusing brake", the inhibit signal (H) is outputted and the focusing control section 12 receives this inhibit signal and applies an electromagnetic brake to the focusing motor $M_F$. Then, it returns to the above conditional step "zooming operation?" again. This repeating operation is called a standby loop.

When the operating switch 13 is switched onto the side of the up-contact 13a and is then closed, the drive control section 12a detects the telescopic signal (TSW). Thus, the judging result in the next step "focusing start?" is YES, thereby escaping from the above standby loop. In the next conditional step "Is direction on proximate side?" through the input terminal I of the program, the judging result is YES. In the next conditional step "Is lens in proximate position?", the drive control section 12a checks the limit signal (Lm). On the other hand, the lens position judging section 15 receives the output (Fpx) from the maximum drawing-out amount calculating section 9 and judges whether or not the focusing lens group 3 is located within the limiting bands ΔSx1 and ΔSx2 of FIG. 3. When the focusing lens group 3 is located within the limiting bands ΔSx1 and ΔSx2, the lens position judging section 15 outputs the limit signal (Lm). When the focusing lens group 3 is not located within the limiting bands ΔSx1 and ΔSx2, the lens position judging section 15 stops the output of the limit signal (Lm). If the focusing lens group 3 is located at a point 34 in FIG. 3, the above limit signal (Lm) is outputted and the drive control section 12a detects this limit signal and outputs the inhibit signal (H). Thus, the judging result in the step "Is lens in proximate position?" is YES. Thereafter, it proceeds to the step "focusing brake" through the jump output terminal J. It again proceeds to the input terminal I through the above steps "zooming operation?" and "focusing start?", and it further proceeds to the step "focusing brake" from the jump output terminal J. This repeatedly operating loop is called "inhibit loop". A portion surrounded by the terminals I, J and U and a dotted line is called a portion indicative of an operation of "inhibiting judgment".

If the focusing lens group 3 is located at a point 33, the judging result in the above step "Is lens in proximate position?" is NO. In the next step "focusing drive", the drive control section 12a stops the output of the inhibit signal (H) and outputs a correction drive signal (Dfcd). In this case, this correction drive signal (Dfcd) simply controls the driving direction and the stoppage. The focusing control section 12 receives this correction drive signal and drives the focusing lens group 3 from the point 33 toward the point 34, i.e., in the direction of the arrow 30. Then, it returns to the step "focusing drive?" and the same operation is repeatedly performed. This operating loop is called a drive loop. When the focusing lens group 3 reaches the limiting band ΔSx1, the flow chart is escaped from the above drive loop and proceeds to the inhibit loop as mentioned above.

The operation is similarly performed when the focusing lens is located at points 31 and 32.

When the operating switch 13 is switched onto the side of the down-contact 13b and is closed and the focusing lens group 3 is located at the point 31, the operation of the above inhibit loop is performed. When the operating switch 13 is switched onto the side of the down-contact 13b and is closed and the focusing lens group 3 is located at the points 32, 33 and 34, the operation of the above drive loop is performed and thereby the focusing lens group 3 is driven in the direction of the arrow 29. Accordingly, the similar operation is performed although the driving directions are different from each other.

When the change-over switch 14 is next turned on, the zooming operation is performed as follows. In this case, the operating switch 13 is assumed to be located in the neutral position. The flow chart in FIG. 4 is started from the step "START". In the first conditional step "zooming operation?", the judging result is YES. In the next conditional step "zooming start?", the drive control section 12a checks the wide signal (WSW) and the telescopic signal (TSW) as mentioned above. Since the operating switch 13 is located in the neutral position, the judging result in this step is NO. In the next step "zooming brake", the zoom control section 16 applies an electromagnetic brake to to the zooming motor Mz. It again returns to the step "zooming operation?" and the same operation is repeatedly performed. This operating loop is called a stop loop.

When the operating switch 13 is switched on the side of the up-contact 13a, the judging result in the above step "zooming start?" is YES, thereby escaping from the above stop loop. In the next conditional step "Is direction on telescopic side?", the drive control section 12a judges that the direction is a telescopic direction, i.e., the direction for increasing the magnification by the input of the telescopic signal (TSW). Accordingly, the judging result in this step is YES. In the next conditional step "telescopic terminal", the drive control section 12a reads the focal distance information Zp and checks whether or not the zoom lens group 2 is located at the value ZpT in FIG. 3. If the zoom lens group 2 is located at the Zp=ZpT, the judging result in this step is YES. The next step "zooming brake" is executed and it returns to the step "Is direction on telescopic side?" again through the steps "zooming operation?" and "zooming start?". This repeatedly operated loop is called a zoom inhibiting loop. When the zoom lens is located at the point 33, the judging result in the above step "telescopic terminal?" is NO. In the next step "zooming drive", the zoom control section 16 receives the start signal (STR) from the drive control section 12a and drives the zoom lens group 2 in the direction of the arrow 27.

In the next step "calculate focusing correction", the focusing correction calculating section 11 receives the outputs Fpx and Cfp of the maximum drawing-out amount calculating section 9 and the proportional constant calculating section 10 and outputs the correction amount (Dfp). The drive control section 12a receives this correction amount and outputs a correction drive signal (Dfcd). Namely, since the zoom lens group 2 is moved in the direction of the arrow 27 in FIG. 3, the focusing correction cannot be performed unless the focusing lens group 3 is moved in the direction of the arrow 30 if the photographed object is not moved, as can be seen from FIG. 2. Therefore, the correction amount (Dfp) and the correction drive signal (Dfcd) instruct the direction of the arrow 30.

The operation in the next step "inhibiting judgment" is similar to that in the above-mentioned step "inhibiting judgment", and is an operation for stopping the movement of the focusing lens group 3 when the focusing lens group 3 reaches the limiting band ΔSx1 (or ΔSx2) during the zooming operation. In the next step "focusing correction drive", the focusing control section 12 receives the above signal (Dfcd) and moves the focusing lens group 3 by an amount corresponding to the correction drive signal (Dfcd) in the direction of the arrow 30 and corrects a shift in focus caused by the zooming operation. It returns to the next step "zooming start?" again and the same operation is repeatedly performed until the operating switch 13 is located in the neutral position. This operating loop is called a shift loop. The above operation can be also performed similarly when the operating switch 13 is switched on the side of the down-contact 13b, and therefore the description thereof is omitted in the following description.

The automatically focusing operation will next be described along the flow chart in FIG. 5. This flow chart is started from a step "START". In a first step "distance measuring operation", the photographing distance detecting section 17 measures the distance of the photographed object and outputs measured distance data (AF) corresponding to this distance. The focusing correction calculating section 11 receives this data and calculates a drive amount of the focusing lens group 3 until the focusing position in the next step "calculate drive amount". The focusing correction calculating section 11 further receives the outputs of the maximum drawing-out amount calculating section 9 and the proportional constant calculating section 10 and calculates a limiting drive amount in the next step "calculate limiting drive amount". Namely, when the zooming lens group 2 is located at the Zp1 in FIG. 3 for example, the limiting drive amount shows the positions of the limiting bands $\Delta$Sx1 and $\Delta$Sx2 at this Zp1.

In the next conditional step "Is lens located at end?", the drive control section 12a judges whether or not the focusing lens group 3 is located within the above limiting band $\Delta$Sx1 or $\Delta$Sx2 by the existence or non-existence of the limit signal (Lm). If the focusing lens group 3 is located at the point 34, the judging result in this step is YES. In the next conditional step "excessive direction?", a directional component of the drive amount (correction amount) Dfp from the focusing correction calculating section 11 is checked. When this direction is the direction of the arrow 30, the judging result in this step is YES. When this direction is the direction of the arrow 29, the judging result in this step is NO. When the above judging result is YES, the inhibit signal (H) is outputted in the next step "inhibit focusing drive" to inhibit the focusing operation. In contrast to this, when the above judging result is NO, the above drive amount and the limiting drive amount are compared with each other in the next conditional step "exceed drive amount?". If Dmax$\leq$Dfp, the judging result in this step is YES. IF Dmax$>$Dfp, the judging result in this step is NO. In the case of NO, the focusing operation corresponding to the above drive amount is executed in the next step "focusing drive". In the case of YES, the limiting drive amount is compulsorily outputted as the Dfp in the next step "data replacement".

Namely, when the focusing lens group 3 is located at the points 34 and 31, the drive thereof is executed when the direction for driving the focusing lens group to perform the focusing operation is respectively in the directions shown by the arrows 29 and 30, and is inhibited when the direction for driving the focusing lens group is respectively in the opposite directions. For example, even when the focusing lens group 3 is located at the points 33 and 32, the focusing lens group is moved until only the limiting bands $\Delta$Sx1 and $\Delta$Sx2 on the basis of the limiting drive amount Dmax instead of the drive amount when the focused focal point is located on the proximate and infinite sides exceeding the respective limiting bands $\Delta$Sx1 and $\Delta$Sx2 with respect to the amount to be driven for the focusing operation.

As mentioned above, in this embodiment, the limiting bands $\Delta$Sx1 and $\Delta$Sx2 are calculated instead of a mechanical stopper and the movement of the focusing lens group 3 is stopped when the focusing lens group 3 has reached these limiting bands. Accordingly, it is not necessary to dispose a complicated mechanism such as a mechanical stopper so that the construction of the lens controller can be simplified.

Further, when the focusing lens group 3 is located within the limiting bands $\Delta$Sx1 and $\Delta$Sx2 and the direction for performing the focusing operation (focusing correction) is a direction exceeding the limiting bands, the operation of the focusing lens group 3 is inhibited so that it is not necessary to perform any useless operation. Further, in the case of the mechanical stopper, it is necessary to perform an escaping operation so as to prevent the focusing lens group from hitting against the stopper. However, it is not necessary to perform such an operation in this embodiment. Accordingly, there is no shift in focus caused by the above escaping operation.

The above limiting bands $\Delta$Sx1 and $\Delta$Sx2 are amounts provided by a calculation and have no physical structure. Accordingly, it is easy to judge whether the lens group is not moved by hitting against the above stopper or by an external force manually applied to the lens group with respect to a method for detecting the stopping position of the lens group by an excessive load state of the motor for example. Therefore, it is possible to perform an accurate control of the lens group.

The present invention is not limited to the above embodiment, but can be applied in various kinds of modifications within the scope of the features of the invention.

For example, in the above embodiment, the drive control section 12a once receives the output (Dfp) of the focusing correction calculating section 11 and outputs this output as the correction drive amount (Dfcd). However, in this case, the focusing control section 12 may be constructed to directly receive the output (Dfp).

Further, in the above embodiment, the present invention is applied to the varifocal lens, but can be applied to the drive controls of the zoom lens group and the focusing lens group with respect to the zoom lens. In this case, the moving amount of the focusing lens group is approximately the same (the lens group moves by an equal amount) with respect to the same photographed object in the entire zoom region of the zoom lens. Accordingly, in the embodiment shown in FIG. 1, a functional portion for performing the focusing correction calculation and the focusing correction drive can be omitted. Further, the processing steps "calculate focusing correction" and "focusing correction drive" in the flow chart of FIG. 4 can be omitted.

Next, a second embodiment of the present invention will be described in detail with reference to the accompanying drawings.

Figures 6, 6A:
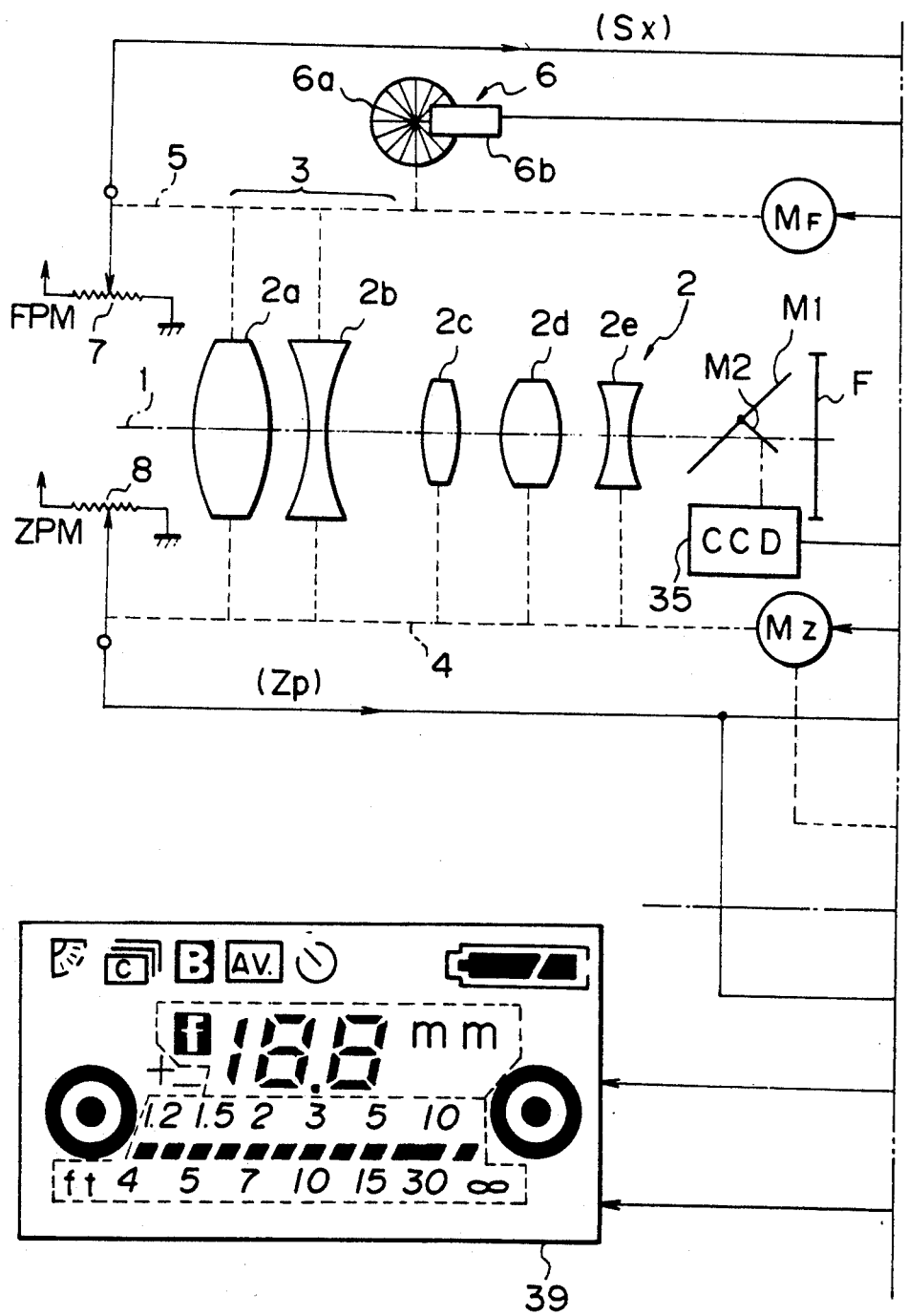
FIG. 6 is a block diagram showing the entire construction of a lens controller in a second embodiment of the present invention.
Figure 6B:
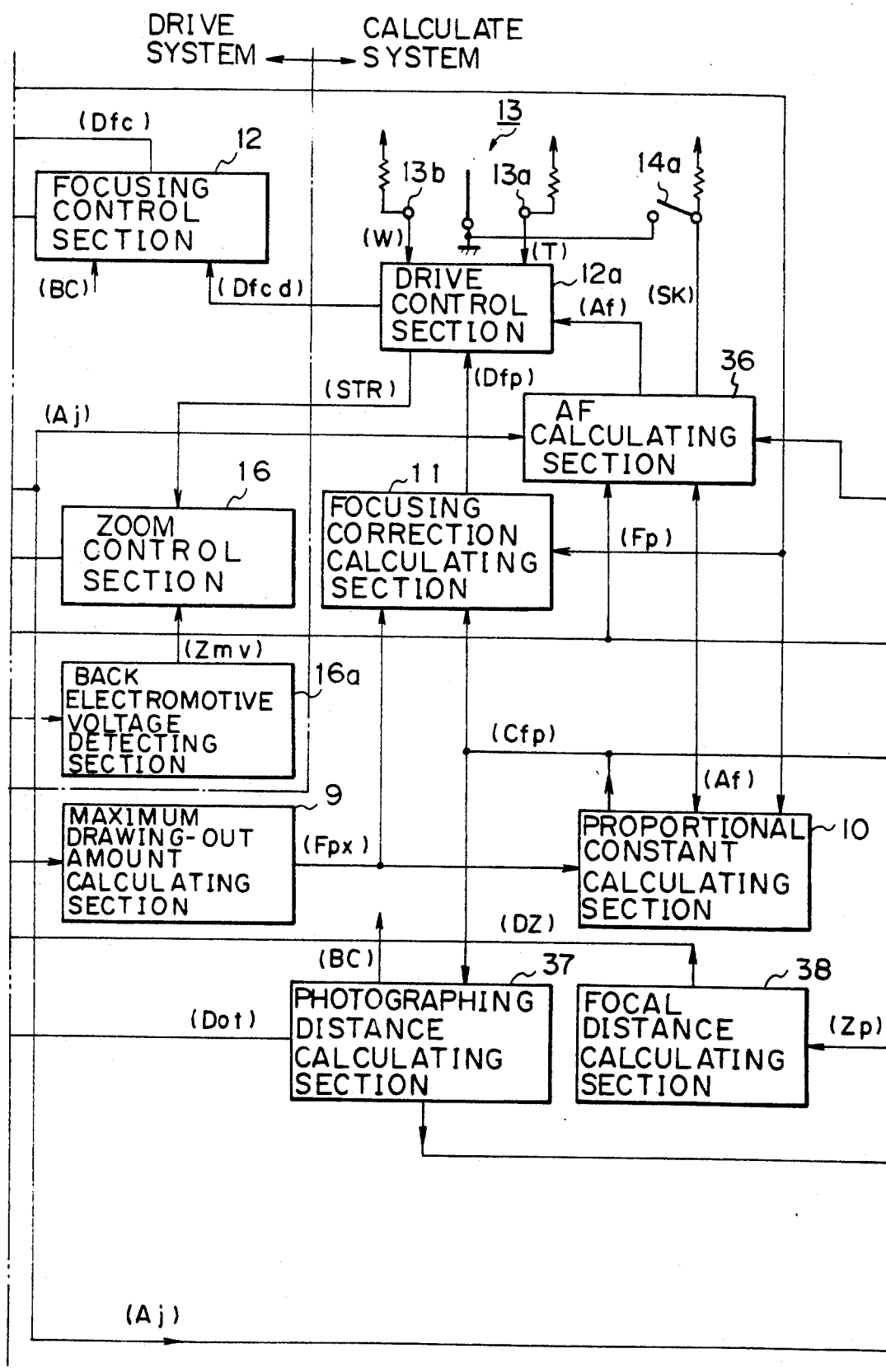
Figure 6C:
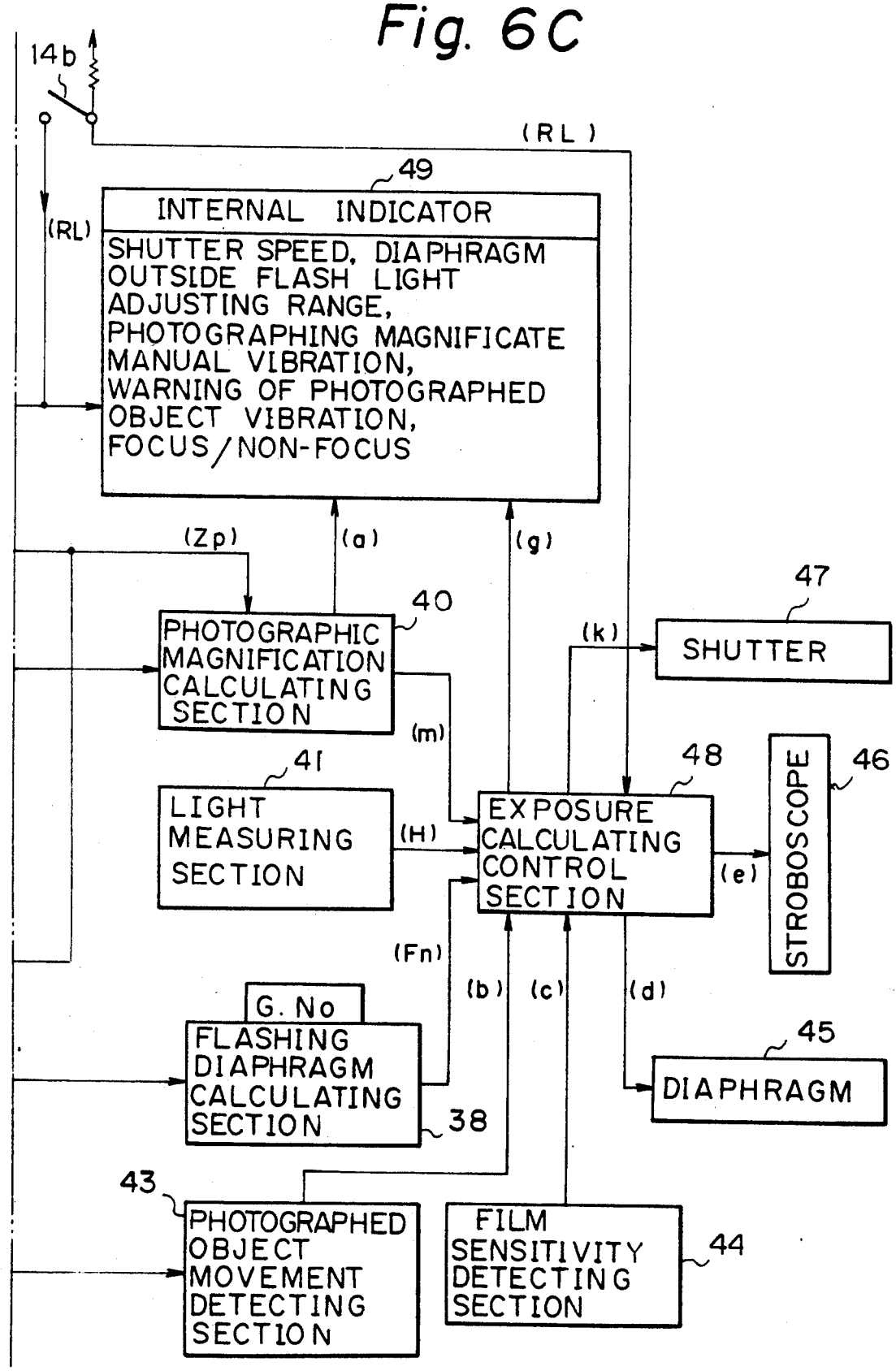

FIG. 6 shows a block diagram of the entire construction of the lens controller in the second embodiment of the present invention.

In the second embodiment shown in FIG. 6, members and portions similar to those shown in FIG. 1 are designated by the same reference numerals and the description thereof with respect to the construction is omitted in the following description.

In FIG. 6, a movable mirror M1 is arranged to be approximately inclined by an angle of 45° with respect to an optical axis 1 at an observing time of a finder. At a photographing time, the movable mirror M1 is rotated by the angle 45° approximately around a rightward upper end as a center in the upward (clockwise) direction so that the movable mirror is escaped from the optical axis 1. A small region of the movable mirror in the central portion thereof is constructed by a half mirror.

An auxiliary mirror M2 is rotatably supported at a base end thereof by the above movable mirror M1. At a distance measuring time (at the observing time of the finder), as shown in this figure, the auxiliary mirror is arranged to be approximately inclined by an angle of 90° with respect to the movable mirror M1 and makes a light beam transmitting through a zoom optical system incident to a distance measuring element (CCD) describe later. At the photographing time, the auxiliary mirror M2 is rotated together with the movable mirror M1 so as to be escaped from the optical axis 1.

A drive control section 12a receives switching signals (W), (T), measured distance information (Af) and a correction amount (Dfp) and outputs a correction drive amount (Dfcd) corresponding to a zoom signal (STR) and the correction amount (Dfp). A focusing control section 12 as a means for judging a focusing state receives a pulse (Dpc), the above correction drive amount (Dfcd) and a small adjustment amount (BC) and controls the judgment of the focusing state and the operation of a focusing motor $M_F$. Pushbutton switches 13, 14a and 14b can be respectively operated from the exterior of the lens controller. The pushbutton switch 13 is constructed by an operating switch as a zoom switch. Reference numerals 13a and 13b are respectively constructed by a contact for increasing the magnification (which is simply called "up-contact" in the following description) and a contact for decreasing the magnification (which is simply called "down-contact" in the following description). The switching signals (T) and (W) are outputted when the operating switch 13 is respectively switched onto the sides of the up-contact 13a and the down-contact 13b. The pushbutton switch 14a constructs a distance measuring switch and outputs a distance measuring signal (SK) when this switch is closed. The pushbutton switch 14b constructs a release switch and outputs a release signal (RL) when this switch is closed.

A distance measuring element 35 is composed of a charge coupled device (which is simply called CCD in the following description) and receives a light beam transmitting through a photographing optical system and reflected by the movable mirror M1 and the auxiliary mirror M2. This CCD 35 converts a formed image of this received light beam to an electric video signal (Ai) and outputs this video signal. An Af calculating section 36 as a means for calculating a preset drawing-out amount receives the video signal (Ai) from this CCD 35 and outputs measured distance information (Af) corresponding to a drive amount of a focusing lens group 3 required until a focusing position from a defocusing amount of the video signal.

A photographing distance calculating section 37 constructs a means for calculating the photographing distance and a means for performing a small adjustment of a correction. The photographing distance calculating section 37 receives a proportional constant (Cfp) and outputs a photographing distance signal (Tt), a small adjustment amount (BC) and a display signal (Dot) corresponding to the photographing distance. A focal distance calculating section 38 receives focal distance information (Zp) and outputs a display signal (DZ) corresponding to the focal distance. An external indicator 39 is composed of a liquid crystal panel and receives the above display signals (DZ) and (Dot) to respectively display the focal distance and the photographing distance, etc.

A photographing magnification calculating section 40 receives the above (Zp) and Cfp) and outputs a photographing magnification (m) and a signal (a). A light measuring section 41 outputs a measured optical signal (H).

A flashing diaphragm calculating section 38 has data about a guide number fixed in advance and outputs an F number (Fn) by receiving the above photographing distance signal (Tt). A photographed object movement detecting section 43 receives the above video signal (Ai) and outputs a signal (b). A film, sensitivity detecting section 44 detects a film sensitivity and outputs a signal (c). A diaphragm 45 receives a signal (d). A stroboscope 46 receives a signal (e). A shutter 47 receives a signal (k). An exposure calculating control section 48 receives the above signals (b) and (c), the above release signal (RL), the above photographing magnification (m), the above measured optical signal (H) and the F number (Fn), and outputs the signals (d), (e), (g) and (k). An internal indicator 49 receives the above signals (a) and (g).

Figure 7:
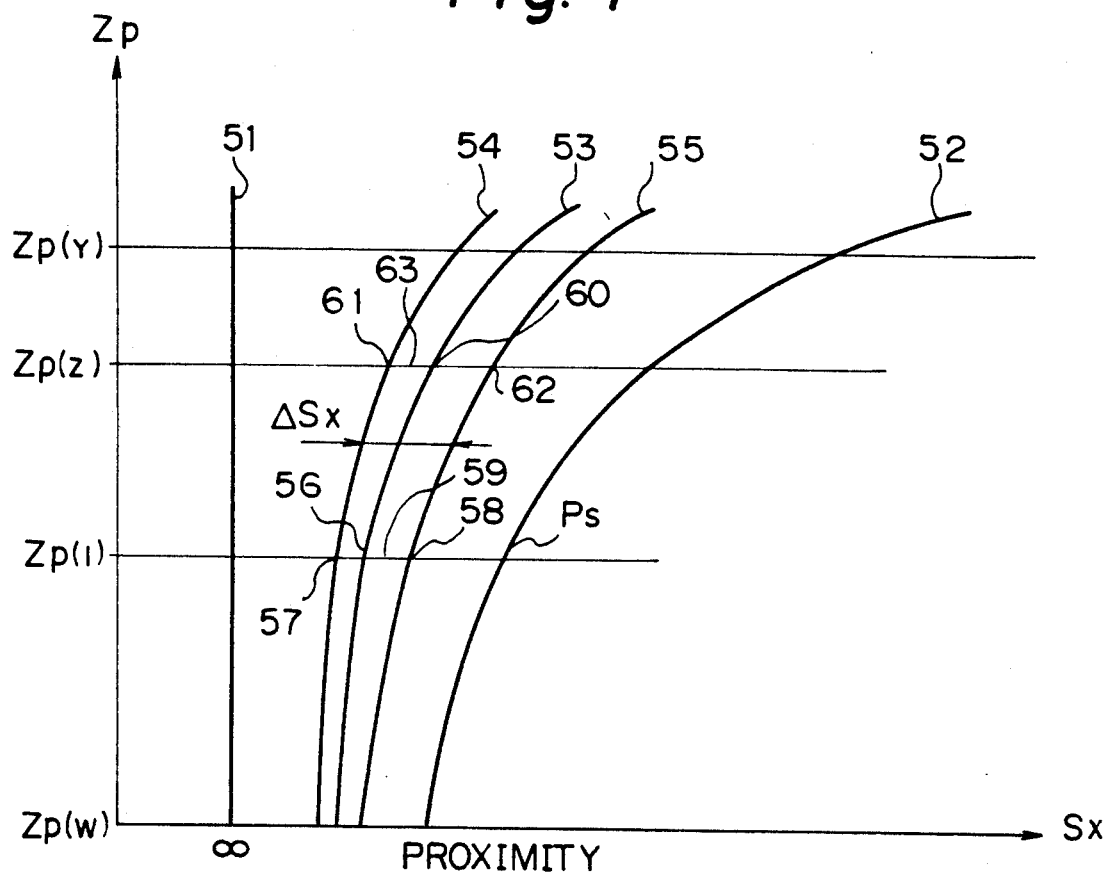
FIG. 7 is a characteristic graph for explaining the operation of the lens controller in the second embodiment of FIG. 6.

FIG. 7 is a characteristic graph for explaining the operation of the lens controller in the embodiment shown in FIG. 6.

In FIG. 7, the focal distance information (Zp) and the focusing position information (Sx) mentioned above are respectively shown on the axis of ordinate and the axis of abscissa. Reference numerals 51, 52 and 53 respectively designate focusing curves in an infinite position, a proximate position (for example, 1.2 m) and an arbitrary position. Reference numerals 54 and 55 designate limiting curves separated from the above focusing curve 53 by a small distance on the infinite side and on the proximate side, respectively. Δ Sx designates a focusing range showing the width of this limiting curve. Reference numerals 56 to 59 designate points on Zp=Zp(1). In particular, the points 57, 56 and 58 designate intersection points of the limiting curve 54, the focusing curve 53 and the limiting curve 55, respectively. Reference numeral 59 designates a provisional stop position. Reference numerals 60 to 63 designate points on Zp=Zp(2). In particular, the points 60, 61 and 62 designate intersection points of the focusing curve 53, limiting curve 54 and the limiting curve 55, respectively. Reference numeral 63 designates a provisional stop position. Zp(I) designates a value of the Zp on the telescopic side. Zp(w) designates a value of the Zp on the wide side.

Figure 8:
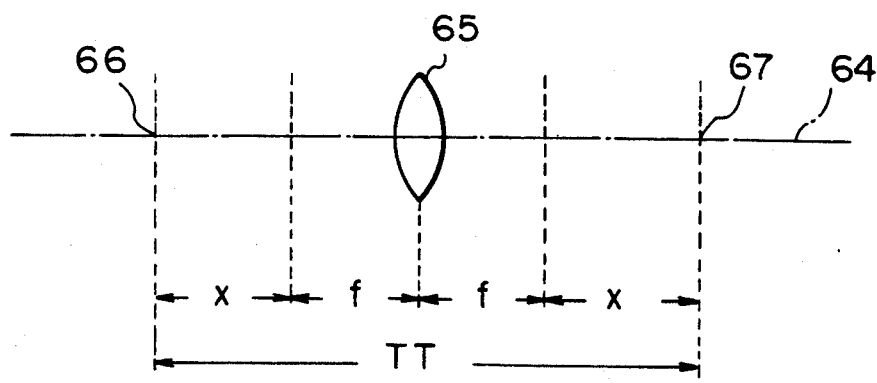
FIG. 8 is a view for explaining the principle of another operation of the lens controller in the second embodiment.

FIG. 8 is a diagram for explaining the principle of another operation of the lens controller in this embodiment of the present invention.

In FIG. 8, reference numerals 64, 65, 66 and 67 respectively designate an optical axis, a lens, an object and a film face. Reference numerals x, f, x' and TT respectively designate a drawing-out amount on a front side, a focal distance, a drawing-out amount on a rear side and a photographing distance.

First, the principle will next be described. In the optical system shown in FIG. 8, as is well known, the following fundamental formulas are formed.

$$TT = x + 2f + x' \quad (2)$$

$$f^2 = xx' \quad (3)$$

In the formula (2), when $T \gg x'$, the $x'$ can be neglected so that the formula (2) can be represented as $TT = x + 2f$. When the formula (3) is substituted into this formula, the following formula is obtained.

$$TT = (f^2/x') + 2f \quad (4)$$

In the formula (4), if the f is already known, the x' is outputted by an automatic focusing calculation (the proportional constant (Cfp) in FIG. 6). Accordingly, the photographing distance calculating section 37 can output the photographing distance signal (Tt) by calculating the formula (4). The photographing magnification m can be calculated by the following formula, $$m = x'/f \tag{5}$$

so that the photographing magnification calculating section 40 is constructed to perform this calculation.

Figure 9A:
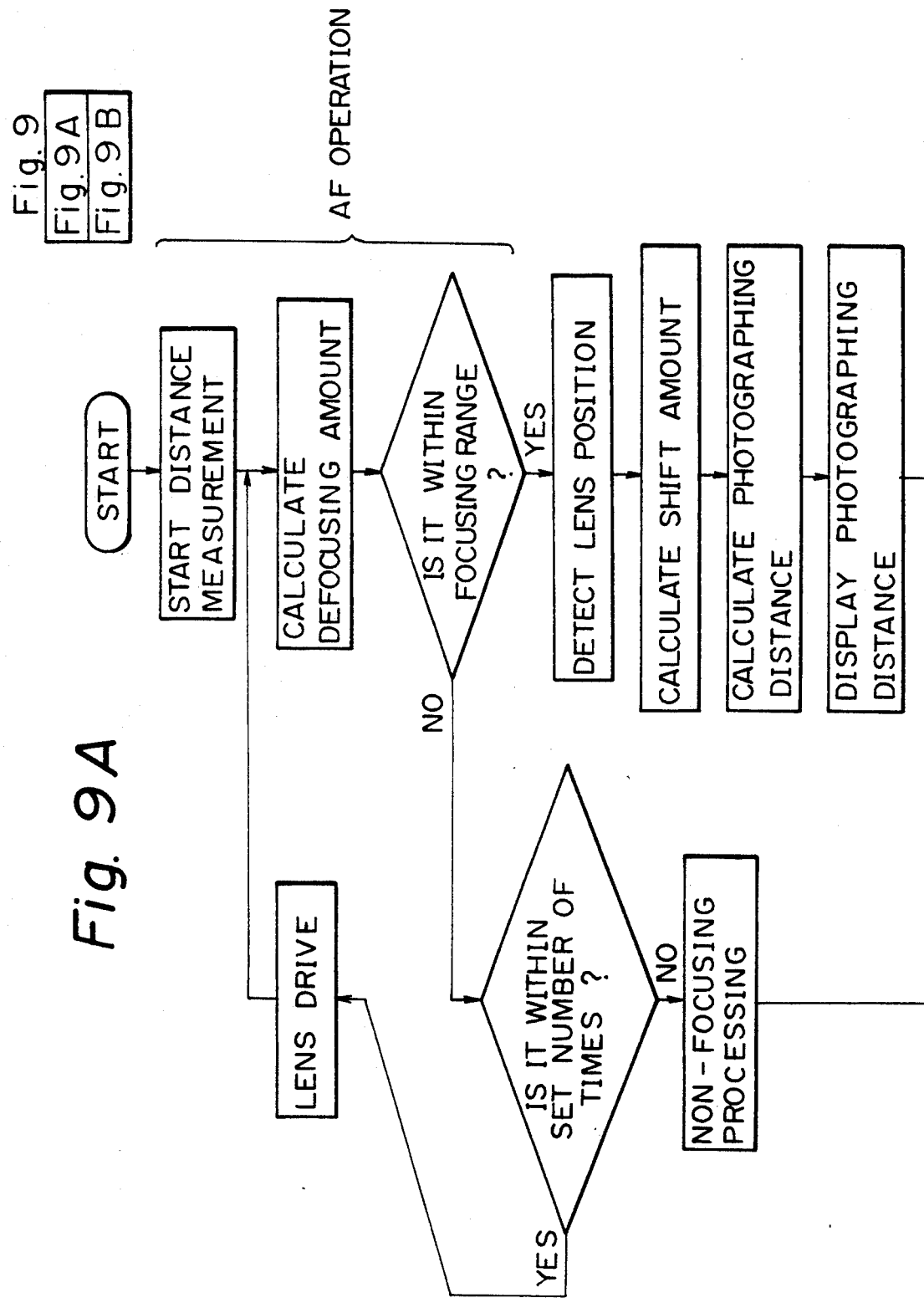
FIGS. 9 and 10 are flow charts for explaining an operational sequence of the lens controller in FIG. 6 and respectively show an operation for a slight adjustment and an operation for determining a shutter speed.
Figure 10:
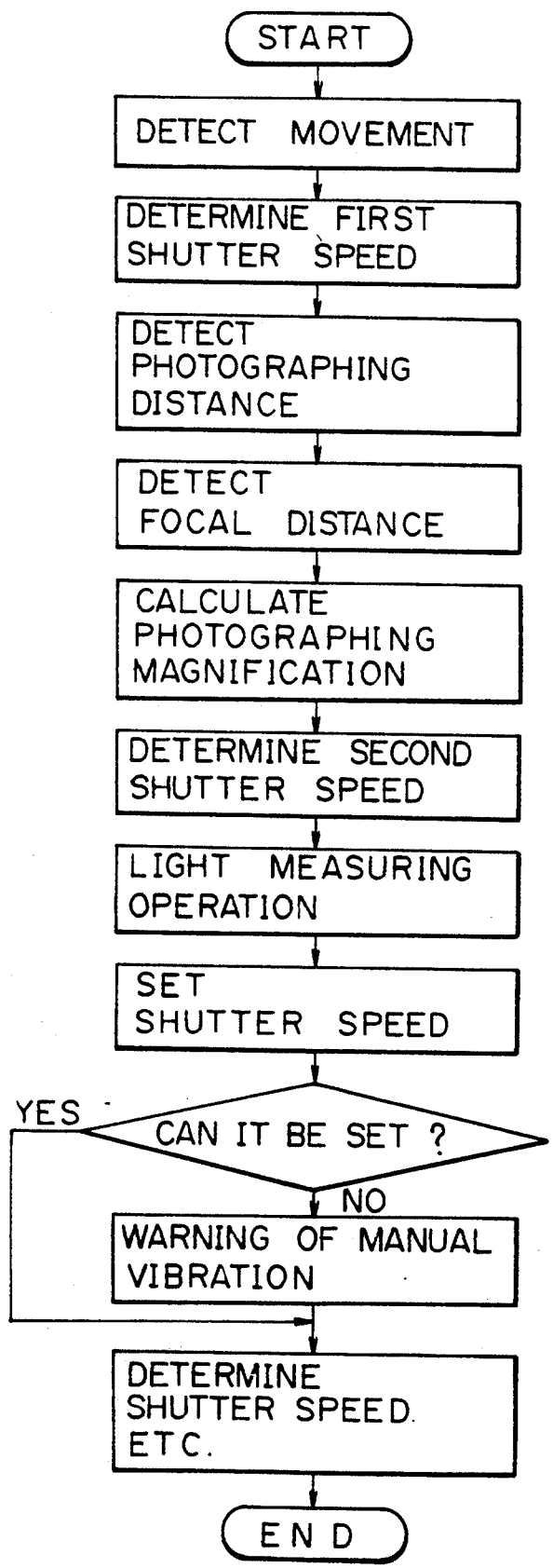

FIGS. 9 and 10 are flow charts showing an operational sequence of the lens controller in this embodiment and respectively correspond to a fine adjustment operation and an operation for determining a shutter speed.

The operation of the lens controller in this embodiment constructed as above will next be described along the above-mentioned flow chart. The fine adjustment operation in FIG. 9 with first be described. It is assumed that the zoom lens group 2 is located at the position shown by Zp=Zp(1) in FIG. 7 and the focusing lens group 3 is located at a point Ps. Further, it is assumed that the unillustrated photographed object is located in a position shown by the distance thereof corresponding to the intersection point 56.

When an operator closes the distance measuring switch 14a, the distance measuring signal (SK) is outputted and the flow chart in FIG. 9 is started from a step "START". In a first step "start distance measurement", the AF calculating section 36 and the CCD 35 are started to be operated. A light beam passing through the zoom lens group 2 from the photographed object is transmitted through the movable mirror M1 and is reflected by the auxiliary mirror M2, thereby forming an image on the CCD 35. This image becomes a video signal (Ai) and is inputted to the AF calculating section 36. The AF calculating section 36 outputs an amount to be driven for the focusing operation as measured distance information (Af) in the next step "calculate defocusing amount". The proportional constant calculating section 10 receives this information and outputs a proportional constant (Cfp) in the focal distance Zp=Zp(1). The focusing correction calculating section 11 receives this proportional constant and outputs a correction amount (Dfp). The focusing control section 12 receives a correction drive amount (Dfcd) outputted through the drive control section 12a and checks a pulse (Dfc) and judges whether the focusing lens group 3 is located within the Δ Sx in FIG. 7 in the next conditional step "Is it within focusing range?". In the present case, the focusing lens group 3 is located at the point Ps and is not still driven. Accordingly, the judging result in this step is NO. In the next conditional step "Is it within set number of times?", the drive control section 12a checks whether the number of drives is within the set number of times or not. In this case, the focusing lens group 3 is still not driven so that the judging result in this step is YES. In the next step "lens drive", the focusing control section 12 drives the focusing lens group 3 on the basis of the above (Dfcd). When the focusing lens group 3 is moved from the point Ps onto the infinite position side and exceeds the intersection point 58, the focusing control section 12 counting the pulse (Dfc) from the focusing counter 6 stops the operation of the focusing motor $M_F$. The focusing lens group 3 is assumed to stop at the provisional stop point 59.

The flow chart returns to the step "calculate defocusing amount" again. This loop is called a loop indicative of an AF operation. The judging result in the next conditional step "Is it with focusing rate?" is YES since the focusing lens group 3 is located within the Δ Sx. In the next step "detect lens position", the photographing distance calculating section 37 receives the focusing position Fp at the intersection point 59 through the proportional constant calculating section 10. In the next step "calculate shift amount", the photographing distance calculation section 37 calculates the difference between the intersection point 56 (closest to a true value) and the provisional step position 59. After the correction of this difference, the photographing distance calculating section 37 outputs a display signal (Dot) and a photographing distance signal (Tt) and further outputs the above difference as a fine adjustment signal (BC). In the next step "display photographing distance", the external indicator 39 displays a more correct photographing distance and displays the completion (success) of the focusing operation in the next step "focusing display". In the next conditional step "distance measurement continued?", the AF circulating section 36 checks the distance measuring signal (SK). When the distance measuring switch 14a is opened, the judging result in this step is NO. When the distance measuring switch 14a is continued to be closed, the judging result in this step is YES. In the present case, it is assumed that this distance measuring switch is continued to be closed so that the judging result in this step is YES. In the next conditional step "release ON?", the AF calculating section 36 checks the release signal (RL). When the release switch 14b is closed, the judging result in this step is YES. When the release switch 14b is opened, the judging result in this step is NO. A loop from the judging result NO in this step is called a release waiting loop.

When the operator closes the release switch 14b, the judging result in this step is YES. In the next step "fine adjustment drive", the focusing control section 12 moves the focusing lens group 3 from the provisional stop position 59 to the intersection point 56 on the basis of the above fine adjustment signal (BC). In the next step "exposure operation", the shutter 47 is operated to expose the image of the photographed object on the film face F. The photographing operation is completed at the next step "end".

A "non-focusing processing" is executed when the number of drives exceeds the set value. The content of the "non-focusing processing" is composed of "detect lens position", the calculation and display of the photographing distance and the display of a non-focusing state, etc. After the step "non-focusing processing" is performed and the judging result in the above step "distance measurement continued?" becomes NO, the operation is completed at the step "end".

The zooming operation and the shift operation for correcting a shift in position of the formed image caused by the zooming operation will next be simply described since these operations have already been described before. When the operator first switches the operating switch 13 as a zoom switch for example on the side of the up-contact 13a, the zoom lens group 2 is started to move while the shift correction operation is performed from the intersection point 56 in FIG. 7. When the above switching state of the operating switch 13 is released at the Zp(2), the zoom lens group 2 stops at the intersection point 60 so that the focal distance is changed from the Zp(1) to the Zp(2). If the photographed object at the Zp(1) is not moved, the focal distance is changed while the focusing state is held from the intersection point 56 to the intersection point 60. The description of the fine adjustment operation at the Zp=Zp(2) is omitted since this operation is similar to the above-mentioned operation.

Next, the operation for determining the shutter speed with be simply described with reference to FIG. 10. This flow chart is started from a set "START". In a first step "detect movement", the photographed object movement detecting section 3 outputs a signal (b) on the basis of the video signal (Ai). In the next step "determine first shutter speed", a limiting shutter speed causing vibration of the photographed object is determined. In the next step "detect photographing distance", the photographing distance signal (Tt) corresponding to the photographing distance TT is outputted on the basis of the formula(4).

Then, the flashing diaphragm calculating section 42 outputs an F number (Fn) by a calculation of G number/TT=F number and determines a diaphragm. When the diaphragm at this time exceeds an associating range, the internal indicator 49 displays the content indicating a range in which the flash cannot be adjusted. On the other hand, in the next step "detect focal distance", the focal distance calculating section 38 calculates the focal distance on the basis of the Zp and outputs this focal distance as a display signal (DZ). In the next step "calculate photographing magnification", the photographing magnification calculating section 40 outputs the photographing magnification (m) on the basis of the formula (5). In the next step "determine second shutter speed", a lower limit of the shutter speed for causing no manual vibration is determined in accordance with the above photographing magnification (m). In the next step "light measuring operation", the light measuring section 41 outputs the measured optical signal (H) and combines the measured optical signal (H) and the diaphragm by the processing of "set shutter speed" in the next step so as to provide a shutter speed not less than the above lower limit. In the next conditional step "Can it be set?", the exposure calculating control section 48 judges whether or not it is possible to perform the above combination. When the shutter speed cannot be set to be equal to or greater than the lower limit causing no manual vibration, the judging result in this step is NO. In the next step "warning of manual vibration", the internal indicator 49 displays the warning of the manual vibration by a signal (g). In the next step "determine shutter speed, etc.", the shutter speed and the diaphragm are determined. The operation is completed at the next step "end".

As mentioned above, in accordance with the present invention, the photographing distance calculating section 37 is constructed to output the fine adjustment signal (BC) from the focusing position information Fp and the measured distance information (Af) transmitted through the proportional constant (Cfp) of the proportional constant calculating section 10. The focusing control section 12 is constructed to move the focusing lens group 3 from the provisional stop position 59 (63) to the intersection point 56 (60) closer to a true value thereof finally before the film exposure. Accordingly, a focusing state having a high accuracy can be obtained so that the focusing curve 53 having a high accuracy can be obtained.

Further, the photographing distance calculating section 37 displays by the external indicator 39 the photographing distance closer to a true value thereof provided after the fine adjustment so that the photographing distance can be displayed with a high accuracy.

Further, the focusing accuracy can be improved while the conventional focusing range shown by the $\Delta Sx$ is held, or irrespective of the large or small value of the $\Delta Sx$. Accordingly, the stability in operation of the lens control system for performing the focusing operation can be held as in the conventional system.

Further, the moving amount of the focusing lens group 3, i.e., the moving distance from the provisional stop position 59 to the intersection point 56 is small so that the above operation can be performed in parallel to the raising operation of the mirrors M1 and M2 and thereby no operational speed is delayed.

The present invention is not limited to the above-mentioned embodiments, but can be applied in various kinds of modifications within the scope of the features of the invention.

For example, FIG. 6 shows the embodiment using the varifocal lens, but the fine adjustment operation and the operation for determining the shutter speed mentioned above are performed even when a single focal point lens is used. In particular, with respect to the fine adjustment operation, the focal distance is fixed at either the Zp(1) or the Zp(2) in FIG. 7.

As mentioned above, in accordance with the present invention, the lens optical system has a very simple construction and is compact and light and cheaply manufactured. The entire lens controller is similarly compact and light and cheaply manufactured. Even when the zoom lens group is moved from an arbitrary first focal point to a second focal point to change the focal distance of the entire lens system, the shift in position of a formed image peculiar to the varifocal lens can be instantly corrected to substantially hold the focusing state. In particular, focusing drive inhibiting means is disposed to inhibit the movement of the focusing lens group in the infinite and proximate directions when the focusing lens group is located in inhibit regions on the infinite and proximate sides, respectively. The focusing drive operation of the above focusing lens group can be performed by the focusing drive means only when the focusing lens group is not located in the inhibit regions on the proximate and infinite sides and the focusing drive direction is opposite to the above inhibited direction even in the inhibit regions. Accordingly, it is possible to avoid in advance the case in which an excessive load is applied to the focusing drive means in both inhibit regions and the drive control is disabled. Therefore, no defocus is caused after the completion of the zooming operation.

Further, in accordance with the present invention, when the drive amount is larger than a limiting drive amount set in advance, the correction calculating means outputs the limiting drive amount instead of the drive amount. It is possible to avoid the case in which the focusing lens group is moved to the proximate or infinite position by an error in detection of the focusing lens group position detecting means and the zoom lens group position detecting means so that an excessive load state is continued. Accordingly, it is possible to propose a lens controller in the varifocal lens which is smoothly operated and has no useless operation and consumes no useless drive force and has a rapid response and an excellent operability.

Further, in accordance with the present invention, in the lens controller cheaply manufactured and having a simple construction, even when the focusing position is provided in a range of a certain width, the photographing distance calculating means calculates an error amount of both outputs of the drawing-out amount detecting means and the preset drawing-out amount calculating means and calculates the photographing distance. Therefore, it is possible to provide a lens controller for calculating the photographing distance with a high accuracy.

Further, in accordance with the present invention, the correction fine adjustment calculating means calculates a fine adjustment amount corresponding to the above error amount in addition to the correction control operation for correcting the shift in position of the formed image particularly peculiar to the varifocal lens to perform the focusing control. Accordingly, it is possible to provide a lens controller for correcting the shift in position of the formed image with a high accuracy.

Many widely different embodiments of the present invention may be constructed without departing from the spirit and scope of the present invention. It should be understood that the present invention is not limited to the specific embodiments described in the specification, except as defined in the appended claims.

What is claimed is:

1. A controller for a varifocal lens in which a drawing amount of a focusing lens group varies according to a position of a zoom lens group, comprising:
    focusing drive means for driving said focusing lens group;
    zoom drive means for driving said zoom lens group;
    first position detecting means for detecting a position of said focusing lens group on an optical axis, and for outputting a first signal representing said detected position of said focusing lens group;
    second position detecting means for detecting a position of said zoom lens group on said optical axis corresponding to a focal distance thereof and for outputting a second signal representing said detected position of said zoom lens group;
    estimated drive amount calculating for calculating an estimated drive amount of the focusing lens group in a driving direction from a present position thereof to a focusing position of imagery position in response to receiving light from a photographed object through a photographing optical system, and for outputting a third signal representing said calculated, estimated drive amount;
    corrected drive amount calculating means for calculating a corrected drive amount for performing a focusing operation on the basis of said first signal from said first position detecting means, said second signal from said second position detecting means and said third signal from said estimated drive amount calculating means, for calculating a ratio of said detected position of said focusing lens group and said detected position of said zoom lens group on the basis of said first signal and said second signal, for outputting a fourth signal representing said calculated, corrected drive amount, and for outputting a fifth signal representing said calculated ratio;
    focusing state judging means for judging as to whether said focusing lens group is located within a focusing zone by comparing said calculated, estimated drive amount with a predetermined value on the basis of said third signal from said estimated drive amount calculating means, and for controlling said focusing drive means on the basis of said fourth signal from said corrected drive amount calculating means so as to drive said focusing lens group toward said focusing position;
    photographing distance calculating means for calculating a distance of the photographed object on the basis of said fifth signal from said corrected drive amount calculating means; and
    correction value calculating means for calculating a correction value for correcting said calculating distance of the photographed object on the basis of said second signal from said second position detecting means through said corrected drive amount calculating means and said third signal from said estimated drive amount calculating means through said corrected drive amount calculating means,
    said controller being adapted to determine a corrected photographing distance on the basis of said calculated distance which is obtained at a time when focusing lens group is judged, by said judging means, to be located within said focusing zone and on the basis of said calculated correction value obtained at said time.

2. A controller according to claim 1, wherein said focusing state judging means is adapted to control said focusing drive means such that said focusing lens group is driven toward the focusing position by a drive amount corresponding to said calculated correction value obtained at said time.

* * * * *